United States Patent
Stermann

(10) Patent No.: US 12,162,106 B2
(45) Date of Patent: Dec. 10, 2024

(54) METHOD OF ASSEMBLING A STRUCTURE IN AIRCRAFT OR SPACECRAFT PRODUCTION

(71) Applicant: Airbus Operations GmbH, Hamburg (DE)

(72) Inventor: Dirk Stermann, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/155,946

(22) Filed: Jan. 18, 2023

(65) Prior Publication Data
US 2023/0226654 A1 Jul. 20, 2023

(30) Foreign Application Priority Data
Jan. 20, 2022 (EP) .................................... 22152481

(51) Int. Cl.
*B23P 19/04* (2006.01)
*B23P 21/00* (2006.01)
*B64F 5/10* (2017.01)

(52) U.S. Cl.
CPC .............. *B23P 19/04* (2013.01); *B23P 21/00* (2013.01); *B64F 5/10* (2017.01); *B23P 2700/01* (2013.01)

(58) Field of Classification Search
CPC ....... B23P 19/04; B23P 21/00; B23P 2700/01; B64F 5/10; B64F 5/50; B64C 1/069; B64C 1/12; B29C 65/48
See application file for complete search history.

(56) References Cited

U.S. PATENT DOCUMENTS

| 5,265,317 A | * | 11/1993 | Angel | B23P 21/00 29/559 |
| 6,003,812 A | * | 12/1999 | Micale | B23Q 35/02 244/119 |
| 6,314,630 B1 | | 11/2001 | Munk et al. | |

(Continued)

FOREIGN PATENT DOCUMENTS

EP 0888202 B1 8/2005

OTHER PUBLICATIONS

European Search Report dated Jun. 27, 2022; priority document.

*Primary Examiner* — Lawrence Averick
(74) *Attorney, Agent, or Firm* — Greer, Burns & Crain, Ltd.

(57) ABSTRACT

A method of assembling a structure in aircraft or spacecraft production wherein two components to be joined together at a joint are provided, each component comprising a joining region. Sealant is applied to one of the component joining regions. An arrangement is formed by positioning the components relative to each other, whereby an uncured layer of the sealant is formed between associated joining regions. The associated joining regions are clamped against each other using a clamping device, and a clamped state is maintained until the layer of sealant has cured to a pre-defined degree, the clamping device being installable on and transportable along with the arrangement. After the layer of sealant has cured to the pre-defined degree, drilling at a plurality of fastening positions is performed to obtain a hole of final dimension at each fastening position, and installation of a final fastener at each fastening position is performed.

20 Claims, 9 Drawing Sheets

(56) References Cited

U.S. PATENT DOCUMENTS

| | | | | |
|---|---|---|---|---|
| 7,774,918 | B2* | 8/2010 | Ainsworth | B23B 51/105 |
| | | | | 29/524.1 |
| 7,874,052 | B2* | 1/2011 | Schueler | B23B 47/287 |
| | | | | 29/281.6 |
| 8,225,508 | B2 | 7/2012 | Houis et al. | |
| 9,021,704 | B2 | 5/2015 | Sarh et al. | |
| 9,102,019 | B2 | 8/2015 | Negroni et al. | |
| 2006/0179637 | A1* | 8/2006 | Schueler | B64F 5/10 |
| | | | | 29/897 |
| 2007/0175015 | A1* | 8/2007 | Ainsworth | B23C 5/06 |
| | | | | 29/524.1 |
| 2008/0017403 | A1* | 1/2008 | Nishii | H05K 3/4069 |
| | | | | 174/250 |

* cited by examiner

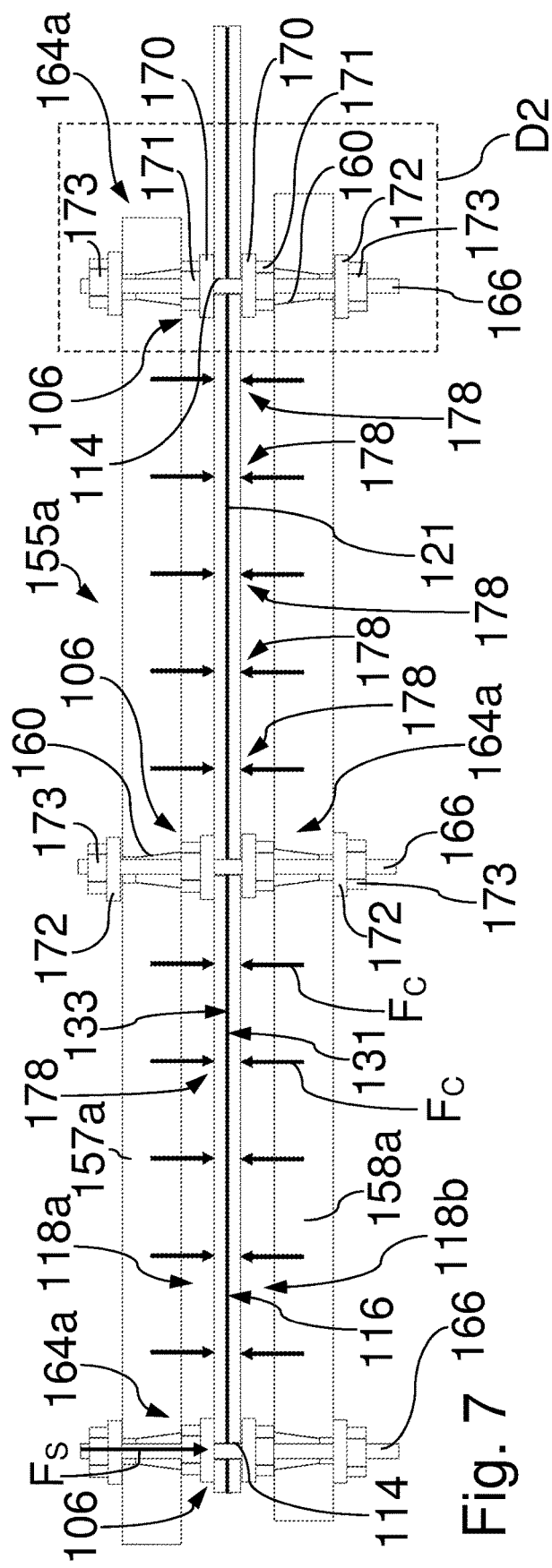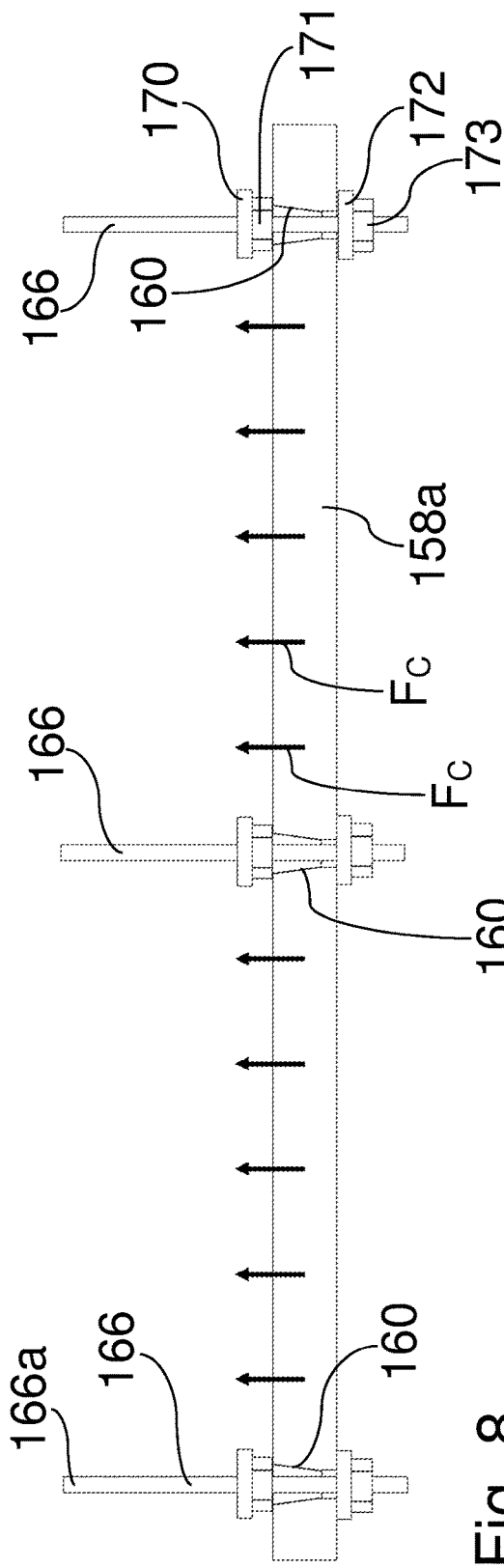
Fig. 7
Fig. 8

# METHOD OF ASSEMBLING A STRUCTURE IN AIRCRAFT OR SPACECRAFT PRODUCTION

CROSS-REFERENCES TO RELATED APPLICATIONS

This application claims the benefit of the European patent application No. 22152481.2 filed on Jan. 20, 2022, the entire disclosures of which are incorporated herein by way of reference.

FIELD OF THE INVENTION

The invention relates to the assembling of structures in aircraft or spacecraft production. A method of assembling such a structure is proposed.

BACKGROUND OF THE INVENTION

Although the invention may be useful in connection with assembling various components and/or subassemblies in aircraft or spacecraft production, in particular involving joints that include installation of a large number of fasteners and preparation of corresponding holes, the invention and the underlying problem will be explained in the following in exemplary manner with reference to the assembly of an aircraft fuselage, in particular a fuselage of an airplane, but without limiting the invention to that example.

A conventional way of producing a fuselage structure for an airplane involves assembling several essentially barrel-shaped fuselage sections from individual shells by connecting the latter along joints that extend e.g., approximately parallel to a longitudinal direction of the fuselage, and then joining the assembled sections along circumferential or "orbital" joints.

Such a conventional approach still requires a significant fraction of work, especially regarding the installation of fasteners at joints, to be carried out manually. Automated systems are generally integrated into workstations specific to either longitudinal or orbital joints assembly. This circumstance is leading to a high number of different automated systems which are integrated into a mainly manual process flow, which may result in automated systems that are less efficient than desired.

It would be desirable to be able to produce an aircraft in an improved manner that is suitable for implementing an efficient, automated execution of connections at joints.

In the context of producing components for aircraft, it has already been proposed to bond parts using a cold or hot curing adhesive and to perform steps of drilling and installation of rivets after curing of the adhesive. During curing, the parts are held in a large, complex and expensive jig.

Furthermore, U.S. Pat. No. 9,102,019 B2 describes a method for joining aircraft structural components, e.g., at an orbital junction of fuselage segments. A process is described which includes positioning and temporarily clamping parts to be joined, drilling a number of pilot holes through the temporarily clamped parts, removing the temporarily clamped parts from one another and cleaning them of burrs and/or metal swarf, preparing the parts for sealing and performing sealing, re-positioning the parts, installing temporary fasteners in the number of pilot holes, and, using an automated robotic drilling and assembly system, drilling a remaining number of holes required in addition to the number of pilot holes as well as installing permanent fasteners in the number of pilot holes and the remaining number of holes.

Another process for assembling two assemblies, such as aircraft fuselage assemblies, is described in U.S. Pat. No. 8,225,508 B2, which aims at application of required pressure in a simple manner over an overlap zone during drilling of holes through this zone, in order to avoid burring and to avoid swarf entering an interface between assembled panels, usually coated with interposition sealant.

A method for assembling parts, including clamping a workpiece using magnetic forces, is described in U.S. Pat. No. 9,021,704 B2.

SUMMARY OF THE INVENTION

Against this background, a problem to be solved by the present invention is to provide an improved approach of assembling a structure in aircraft or spacecraft production, which facilitates automation and helps to reduce cost and effort for producing structures of this kind.

Accordingly, a method of assembling a structure in aircraft or spacecraft production is provided, which comprises:
providing at least two components that are to be joined to each other at a joint in order to form a structural assembly, wherein each of the components comprises a joining region;
applying sealant to at least one of the components in the joining region thereof;
forming an arrangement by positioning the components relative to each other, whereby an uncured layer of the sealant is formed between associated joining regions;
clamping the associated joining regions against each other to achieve a clamped state using at least one clamping device and maintaining the clamped state of the associated joining regions at least until the layer of sealant therebetween and contacting the associated joining regions has cured to a predefined degree, wherein the clamping device is installable on and transportable along with the arrangement; and
after the layer of sealant has cured at least to the predefined degree, performing drilling at at least a plurality of fastening positions within the joining regions in order to obtain a hole of final dimension at each of the plurality of fastening positions, and performing installation of a final fastener at each of the fastening positions.

Further, the problem above can be solved by a clamping device for use in assembling a structure in aircraft or spacecraft production, in particular for use in performing the method of the present invention. The clamping device is installable on and transportable along with an arrangement of at least two components to be joined to each other at a joint in order to form a structural assembly, wherein each of the components comprises a joining region and the arrangement is formed by positioning the components relative to each other with an uncured layer of a sealant formed between associated joining regions. The clamping device is adapted to clamp the associated joining regions to each other and maintain the clamped state of the associated joining regions at least until the layer of sealant therebetween and contacting the associated joining regions has cured to a predefined degree. The clamping device is configured to ensure that a thickness of the layer of the sealant after curing is equal to or less than a pre-defined maximum sealant layer thickness in the area of each of a plurality of fastening positions within the joining regions at which a final fastener is to be installed.

An idea underlying the invention is that via the clamping of the sealant layer during curing thereof, it is possible to obtain a layer thickness of the sealant after curing that does not exceed a pre-defined, required maximum sealant layer thickness in the area of the fasteners. The pre-defined maximum sealant layer thickness helps to ensure that a pre-load of the installed fasteners and a fatigue performance of the joint are obtained that are in accordance with those specified for the joint. With the proposed method, it is advantageously not necessary to install the final fasteners within a period of time during which the sealant is still wet and uncured. Thereby, undesirable constraints e.g., regarding the cycle times in a production process for the structure can be avoided. Furthermore, excessive preliminary tacking of the components at a large number of tacking locations, or large, expensive and inflexible jigs, can be avoided with the aid of the present invention.

The invention facilitates the implementation of automated processes and systems for performing drilling and installation of final fasteners at the joint, preferably along with drilling and installation of fasteners at one or more further joints, in a single station or automated cell with high efficiency, and in particular for a large number of fastening positions and/or for large components and structures.

With the invention, the sealant compound can be applied and the requirements on the sealant layer thickness can be met in a flexible manner without interfering with a highly efficient and automated process of drilling and installing final fasteners. At the same time, the cost and the space requirements for large and immobile jigs can be avoided.

In other words, the present invention makes it possible to easily shift the application of the sealant, within the production workflow, to an earlier station, upstream of drilling and installation of the final fasteners. Accordingly, the present invention enables drilling through a layer of cured sealant compound, fulfilling pre-defined layer thickness requirements.

In this way, workloads such as drilling and fastening can be shifted to other stations which are far beyond in the workflow, as seen from the station where the components are positioned in their target positions and/or the sealant is applied. In particular, these workloads can be shifted from section assembly workstations to an efficient automated station. Integration of automated stations into a highly manual process can be avoided or reduced. Thereby, the capacity of automated systems can be utilized in a significantly improved manner, which makes it possible to improve efficiency and reduce cost.

With the present invention, the tacking of the components in the joining regions can advantageously be confined to a relatively small number of tacking points, or the tacking may even be avoided altogether. Thereby, an unfavorable impact of an excessive number of tacking locations, where the components, in particular, have been pre-drilled, on the efficiency and performance of subsequent automated processes, as well as high manual workload for tacking, can be avoided.

Moreover, the sealant which is cured to the pre-defined degree may be capable of providing bonding of the joining regions at least to some degree, which can help to reduce the efforts for counter holding during drilling and fastener insertion.

In addition, the invention may help to reduce the exposure of operators to wet sealants compared to installation of fasteners through wet sealant layers.

The pre-defined degree of curing can in the context of the present invention in some embodiments correspond to substantially complete curing of the sealant before proceeding to the drilling of holes of final dimension. In preferred embodiments a pre-defined degree corresponding to a curing degree of e.g., 80 to 90 percent, corresponding to about 80 to 90 percent of a hardness considered to indicate complete curing, may be sufficient. In particular, the pre-defined degree of curing may be defined as a Shore hardness threshold. For example, a Shore A hardness of about 30 may in some embodiments be considered to correspond to substantially complete curing of the sealant. In other words, a pre-defined degree of curing in this context corresponds typically to a curing degree in which the sealant does not flow anymore. Without external mechanical effect, the joining regions with the sealant in the pre-defined degree of curing in-between remain basically unchanged in terms of their spatial arrangement relative to each other.

In a development, the drilling in order to obtain the hole of final dimension and the installation of the final fastener at each of the plurality of fastening positions are each performed in an automated manner, in particular in an automated assembly station. Accordingly, the drilling and installation of the final fasteners can be accomplished in an efficient, cost-saving and time-saving manner.

According to an improvement, the method includes removing the clamping device at least partially before performing the drilling in order to obtain the holes of final dimension and the installation of the final fasteners at the plurality of fastening positions. Thereby, the joint can be accessed in a convenient manner for the drilling and final fastener installation. In a variant, at least a part of the clamping device may remain installed on the arrangement during drilling the holes of final dimension, wherein the remaining part may for example be adapted to serve as a counter support for the drilling.

In a development, the clamping may be performed in such a manner that the thickness of the layer of the sealant after curing, in the area of each of the fastening positions within the joining regions at which a final fastener is to be installed, is equal to or less than a pre-defined maximum sealant layer thickness of 50 μm.

In a development, during clamping the associated joining regions, the clamping device applies a clamping force at each of a plurality of clamping force application locations within the associated joining regions. In particular, the clamping device may apply individual, and for example different, clamping forces depending on the clamping force application location. The clamping forces may be adjustable or selectable, for example, e.g., by adjusting or pre-configuring the clamping device. Further preferably, the clamping device is configured to apply a clamping force individually at each clamping force application location, wherein the clamping force may, e.g., be selectable or adjustable. This makes it possible to locally apply clamping force or pressure, preferably at each fastening position, in order to ensure that in a region of each of the clamping force application locations, and preferably in a region of each of the fastening positions, the sealant layer thickness does not exceed the pre-defined maximum sealant layer thickness after curing. Adjustable or selectable clamping forces that may be different depending on the clamping force application location contribute to achieving the desired layer thickness at all fastening positions.

The clamping forces can be applied, for example, using elastic forces or in pneumatic or hydraulic manner. For example, the clamping device may be adapted to apply the clamping force using a plurality of spring-loaded force application elements, or using the Young's modulus of a material from which a plurality of force application elements are formed, e.g., a solid body made from solid material such as, for example, PTFE or an elastomer, acting like a spiral spring. In alternative developments, the clamping device may be provided with actuators, e.g., pneumatic or hydraulic actuators. For example, the pneumatic or hydraulic actuators may comprise pressurizable caps or membranes.

In particular, the clamping force at each of the plurality of clamping force application locations is applied substantially transverse, for example normal, to the uncured layer of the sealant.

In a development, the clamping forces are applied using a first clamping device part arranged on a first side of the joint and adapted to apply a plurality of individual forces acting from the first side, and using a second clamping device part arranged on a second side of the joint opposite the first side and adapted to apply a plurality of individual forces acting from the second side. In this manner, individual clamping forces can be applied precisely at each of the clamping force application locations.

According to another development, the clamping forces are applied using a first clamping device part arranged on a first side of the joint and adapted to apply a plurality of individual forces acting from the first side, and using a second clamping device part configured as a common rigid counter support part and arranged on a second side of the joint opposite the first side. In this way, the effort and cost for the clamping device can be reduced, while the clamping device is still adapted to provide individual clamping forces at each of the clamping force application locations. In some configurations, a common rigid counter support part on the second side can be sufficient to obtain the desired sealant layer thickness after curing.

In still another development, the clamping forces are applied using a clamping device part arranged on a first side of the joint and adapted to apply a plurality of individual forces acting from the first side, and using at least one retaining piece on a second side of the joint opposite the first side. In some configurations, it may be sufficient to apply individual forces from the first side using the clamping device part on the first side, which is retained on the arrangement via the retaining piece on the second side, and without a counter support part placed opposite the plurality of the clamping force application locations. This may be appropriate in some configurations to obtain the desired sealant layer thickness with a relatively simple and cost-effective configuration of the clamping device.

In particular, the components include at least one shell-type component. The shell-type component may, in particular, be a fuselage shell as part of the structure. In further developments, the at least two components may each be a shell-type component such as a fuselage shell, for instance. Joining such shell-type components to each other and/or to other additional components may in many cases require a considerable number of fasteners and considerable effort, and accordingly, the improvements, e.g., regarding efficiency, flexibility and suitability for automation of the method proposed herein may be particularly advantageous. Efficient use of automation for assembling a complex joint as in the case of joining fuselage shells can lead to important savings in terms of effort, time and costs. In other implementations, an application of the invention to other types of shell-type components, e.g., for a wing to produce a wing structure, is conceivable.

More particularly, the joint may be a longitudinal joint, in particular a longitudinal joint extending substantially parallel to a longitudinal axis of a fuselage. However, in other implementations, it is conceivable to apply the invention to other joints.

In particular, in further developments, the invention can be applied to any other fastening of an individual part as a first one of the components to an outer skin of a fuselage or fuselage shell as a second one of the components, wherein the individual part may, in examples, be a stringer, a crackstopper, or a clip ensuring a coupling of a frame to the skin. In particular, in some developments a stringer, a crackstopper and/or a clip as one of the components may be adhered to one or both of the shell-type components using the sealant, wherein automated installation of final fasteners may be performed using an automated device operating in an inner region of a fuselage section.

Further, the invention may in further developments be applied to other joints which require sealing, e.g., a frame coupling as a first one of the components, which may be adhered to one or more adjacent frame segment(s) as (a) second one(s) of the component(s) using the sealant.

In a further development, the drilling in order to obtain the hole of final dimension and the installation of the final fastener at each of the plurality of fastening positions at the joint are performed at an automated station that is configured to additionally perform automated drilling of holes and automated installation of final fasteners at further fastening positions at a further joint, in particular at an orbital joint. In this manner, a considerable advantage compared to traditional section assembly of an aircraft fuselage can be obtained, for example. Such an automated station may be a Combined Automation Station, which is configured to perform drilling and installation of final fasteners at the longitudinal joints and at at least one orbital joint at the same automated station. In this manner, the number of automated systems in the production line can be reduced and the efficiency of the automated processes can be improved.

According to a further development, in order to support reaction forces induced by the clamping action, the clamping device is supported on the arrangement. In this manner, the clamping device can be easily and flexibly transported along with the arrangement, for example from one assembly station to a subsequent one, if required. In particular, the clamping device may be supported on the arrangement using a mechanical connection extending through the components in the associated joining regions thereof, and/or may be supported on the arrangement using magnetic force and/or using negative pressure or vacuum. A mechanical connection extending through the components in the joining regions requires only little space and can be implemented also if space for installing the clamping device is restricted. Supporting the clamping device on the arrangement using magnetic force or using a negative pressure or vacuum does not require a through-opening in the components and may be useful if there is sufficient space for installing a magnetic device or a device capable of using negative pressure or vacuum for coupling to the arrangement such as vacuum pads. In some developments, a mechanical connection may be combined with the use of magnetic force and/or of negative pressure or vacuum for supporting the clamping device on the arrangement.

In a further development, the plurality of fastening positions is or comprises a plurality of first fastening positions.

In this development, the method comprises tacking the components at at least one second fastening position, preferably at each of a plurality of second fastening positions, after the uncured layer of the sealant has been formed between the associated joining regions. In this way, the components can be pressed against each other by tacking at the second fastening position(s), and in particular, the tacking can also provide a way of supporting the clamping device in a simple and expedient manner.

In particular, the plurality of first fastening positions may correspond to a first fraction of an entire set of fastening positions that is pre-defined for the joining regions, while the plurality of second fastening positions may correspond to a second fraction of the entire pre-defined set of fastening positions, wherein the first fraction is larger than the second fraction. For example, the number of second fastening positions may correspond to approximately 10 percent and the number of first fastening positions may correspond to approximately 90 percent of the number of fastening positions included in the entire pre-defined set thereof at the joint. Accordingly, a simple way of supporting the clamping device can be provided, while the number of tacking locations is limited, and a high efficiency of the entire process can be obtained. In the present context, a pre-defined set of fastening positions should be understood as a set of positions that have been defined during the design of the structure as locations where fasteners are to be installed, even if at the outset of the process of joining the components for assembling the structure, the components do not yet comprise any physical feature corresponding to the pre-defined fastening positions, except for pilot holes, for example, at a few fastening positions in some embodiments.

In a development, tacking the components comprises tacking the components to each other in the joining regions using a tacking assembly comprising a coupling element extending through a preliminary hole at the second fastening position, preferably at each of two or more of the second fastening positions. In particular, the preliminary hole has a non-final dimension. In this development, the method further comprises installing the clamping device on the arrangement by coupling the clamping device to the arrangement using at least the coupling element installed in the preliminary hole, preferably using several coupling elements, each installed in one of several preliminary holes. In this way, the coupling element can advantageously be used both for tacking the components and for supporting the clamping device and coupling the latter to the arrangement. Only little space is required, and a mechanical connection between two sides of the joint can be easily established.

In a further improvement, the coupling element is formed as a rod, in particular a threaded rod, or as a bolt or a screw. Accordingly, both the tacking and the coupling of the clamping device to the arrangement are possible in a simple manner and can be easily released.

In a development, the tacking assembly may further comprise at least one nut that is engageable with the coupling element, e.g., the threaded rod, bolt or screw.

In a development, the tacking of the components and the installation of the clamping device on the arrangement, e.g., using the coupling element(s), may be performed in one step or in subsequent steps.

It may in further developments be provided that tacking of the components at some of the second fastening positions is performed beforehand in a separate step, while tacking at others of the second fastening positions may be performed along with the installation of the clamping device in the same step. In this way, the components may be securely held together beforehand while the tacking at the other second fastening positions can be accomplished in a time-saving manner.

In a development, de-installing at least one of the coupling elements, enlarging the preliminary hole used to accommodate the de-installed coupling element at the second fastening position, and installing a final fastener in the enlarged hole at the second fastening position are performed after automated drilling and automated installation of the final fasteners at the first fastening positions. In this way, the coupling elements may serve, during the automated drilling and installation of the final fasteners at the first fastening positions, for additionally tacking and holding the components together at the joint, and may help to improve the stability of the arrangement while the connections at the first fastening positions are completed.

In another development, de-installing at least one of the coupling elements, enlarging the preliminary hole used to accommodate the de-installed coupling element at the second fastening position, and installing a final fastener in the enlarged hole at the second fastening position are performed before automated drilling and automated installation of the final fasteners at the first fastening positions. In this manner, the final fasteners at the second fastening positions may contribute to an improved stability of the arrangement during the completion of the connections at the first fastening positions in automated manner.

In particular, enlarging the preliminary hole and installing the final fastener in the enlarged hole in the preceding improvements at the second fastening position, before or after automated drilling and installation of the final fasteners at the first fastening positions, may be performed at least partially manually and/or using hand-held tools.

According to a further development, at least one of the coupling elements is deinstalled, and after de-installing the at least one of the coupling elements, drilling and installation of the final fasteners at the first fastening positions, enlarging the preliminary hole used to accommodate the de-installed coupling element at the second fastening position, and installing a final fastener in the enlarged hole at the second fastening position are performed in an automated manner. Accordingly, the efficiency of the process can be improved further as the final connections at the second fastening position(s) can be formed in an automated way.

In some developments, the connections at the second fastening positions are not necessarily finalized all in the same manner, but various combinations of the preceding developments are possible. For instance, at one or more of the secondary fastening positions, the coupling element(s) can be removed, the preliminary hole(s) can be enlarged and the final fastener(s) can be installed before automated completion of fastener installation at the first fastening positions, while at one or more other(s) of the second fastening positions, the coupling element(s) can be de-installed, the preliminary hole(s) can be enlarged and the final fastener(s) can be installed after the automated completion of fastener installation at the first fastening positions. At still one or more other of the second fastening positions, the preliminary hole may be enlarged and the final fastener may be installed in an automated process, e.g., along with the first fastening positions. Various combinations of installing final fasteners at second fastening positions in the way just described before and/or after an automated process at the first fastening positions and/or in automated manner along with the first fastening positions is conceivable. In this way, reliable handling of the arrangement of the components is made possible, for example, while significant improvements in efficiency can be obtained.

According to a development, before the sealant is applied to the at least one of the components, the components are temporarily positioned relative to each other, and subsequently, pre-drilling is performed at the second fastening position(s) to obtain the preliminary hole(s) through the associated joining regions. In particular, if the pre-drilling is performed in this manner before the sealant is applied, the preliminary hole(s) can be deburred and/or the joining regions can be cleaned, in particular at the interface between the joining regions, after pre-drilling. For example, the gap between the joining regions can be opened again after the pre-drilling step for cleaning and/or deburring. In this way, chips and burrs can be reliably removed from within the gap in order to obtain a joint of high quality.

In a further development, pre-drilling is performed at the second fastening position(s) to obtain the preliminary hole(s) through the associated joining regions, after the uncured layer of the sealant has been formed between the associated joining regions. In this way, the efficiency of the process may be further improved, as it is not required to re-open the joint before applying the sealant. Preferably, in this case, it is ensured that burrs and contamination of the gap by chips from the pre-drilling are prevented, for example by a proper clamping of the joining regions during the pre-drilling process. This may contribute to achieving short station lead times.

In a further development of the method, the preliminary hole or preliminary holes or some of these may already be present in the components at the one or more of the second fastening positions at the time the components are delivered, so that no pre-drilling needs to be performed at these positions.

The improvements, enhancements and developments of the present invention may be arbitrarily combined with each other whenever this makes sense. Moreover, other possible enhancements, implementations and developments of the present invention comprise combinations of features of the invention which have been described above or will be described in the following in relation to the detailed description of embodiments, even where such a combination has not been expressly mentioned.

In particular, the improvements, enhancements and developments of the invention described above may be applied in analogous manner to each of the method and the clamping device proposed herein.

BRIEF DESCRIPTION OF THE DRAWINGS

The invention will be explained in the following with reference to the schematic figures of the drawings which illustrate embodiments of the invention. Herein:

FIG. 7 illustrates an installed clamping device clamping the joining regions by applying individual forces at a plurality of force application locations, in accordance with the first embodiment, in a sectional view;

FIG. 8 shows a clamping device part with a plurality of coupling elements pre-installed thereon, as may be used in a first variant of the method of the first embodiment, in a sectional view;

Figure 1:
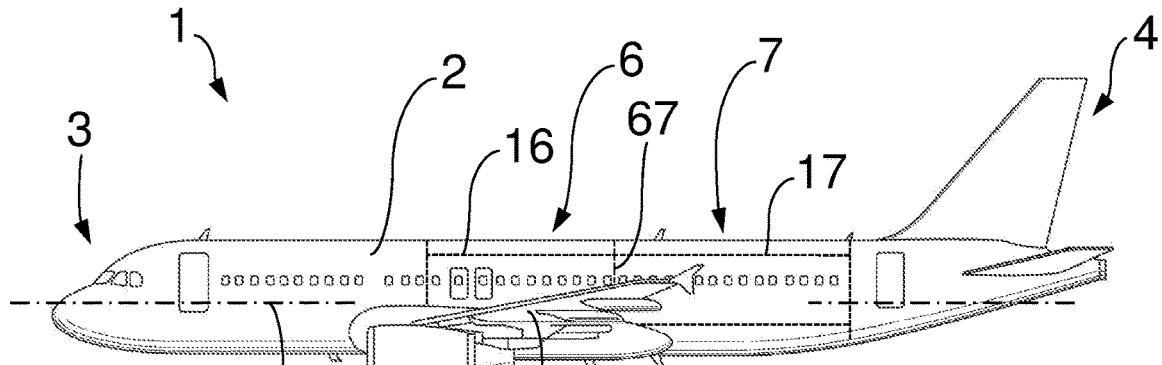
FIG. 1 displays a side view of an aircraft, the fuselage of which may be assembled using a method and a clamping device according to embodiments described herein.

The enclosed drawings are intended to illustrate embodiments of the invention so that the invention may be further understood. The drawings, in conjunction with the description, are intended to explain principles and concepts of the invention. Other embodiments and many of the advantages described may be inferred from the drawings. Elements of the drawings are not necessarily drawn to scale.

Elements, features and components which are identical or which have the same function or effect have been labeled in the drawings using the same reference signs, except where explicitly stated otherwise.

DETAILED DESCRIPTION OF THE PREFERRED EMBODIMENTS

Figure 2:
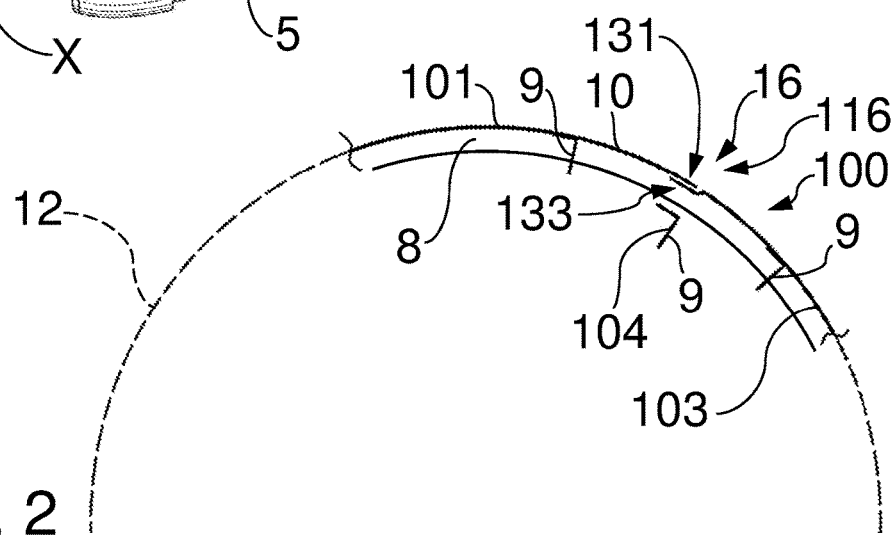
FIG. 2 displays some components that are to be assembled to form an assembly for a fuselage structure in an upper region of the fuselage, in a schematic cross-sectional view of the fuselage.

FIG. 1 displays an aircraft 1, for example a commercial passenger aircraft, comprising a fuselage 2, a nose 3, an empennage 4 as well as wings 5. FIG. 1 shows a first, barrel-shaped fuselage section 6 and a second, barrel-shaped fuselage section 7, joined to each other at a circumferential or orbital joint 67. The fuselage sections 6 and 7 are structural assemblies that form part of a structure 12 of the fuselage 2, in FIG. 1 in exemplary manner in the rear part of the fuselage 2. The fuselage structure 12 is displayed partially in schematic manner in FIG. 2 in cross-section and comprises circumferentially extending frames 8, longitudinally extending stringers 9, and a skin 10 stiffened by the frames 8 and stringers 9.

Each of the sections 6 and 7 is formed with several fuselage shells, connected to each other at longitudinal joints that extend essentially parallel to a longitudinal direction X of the aircraft 1. In exemplary manner, one longitudinal joint 16 of the first section 6 and one longitudinal joint 17 of the second section 7 are schematically indicated in FIG. 1. The fuselage shells each include a portion of the skin 10, as well as several stringers 9 and frame segments for forming the frames 8.

The shells, in particular the segments of the frames 8 and/or stringers 9 and/or the portions of the skin 10, may, for example, be made from an aluminum material, e.g., an Al-alloy, but may instead be made from another type of material suitable for the formation of joints using fasteners and involving the application of a sealant compound at the joints 16, 17, 67.

In order to assemble the structure 12, a multitude of fasteners, for example rivet-type or bolt-type fasteners, are installed in holes that are drilled at the longitudinal and orbital joints 16, 17, 67. Drilling of final holes at least for a large, predominant percentage of all of these fasteners and installation thereof along the joints 16, 17, 67 are carried out in an automated manner in accordance with embodiments described in more detail below, in a so-called combined automation station.

In the following, a first component 101 is considered to correspond to a first fuselage shell and a second component 103 is considered to correspond to a second fuselage shell. For assembling the structure 12, components 101 and 103 are designed to be joined to each other at a joint 116, which may be one of the longitudinal joints 16 or 17 or any other longitudinal joint at one of the sections 6, 7, for instance. The components 101, 103 each comprise a joining region 131 and 133, respectively, which, e.g., may be portions of the skin 10. In order to form the joint 116, the joining regions 131, 133 are overlapped and connected using fasteners, e.g., rivets. A third component 104 in the form of a stringer 104 and/or a crackstopper and/or a clip, not shown in the figures, can also be provided and connected using fasteners to one or both of the components 101, 103. The following discussion is provided with reference to the shell-type components 101, 103, but it is understood that the description given is applicable in analogous manner to the connection of other components, e.g., a stringer, clip or crackstopper to one or both of the shells 101, 103.

Figure 3:
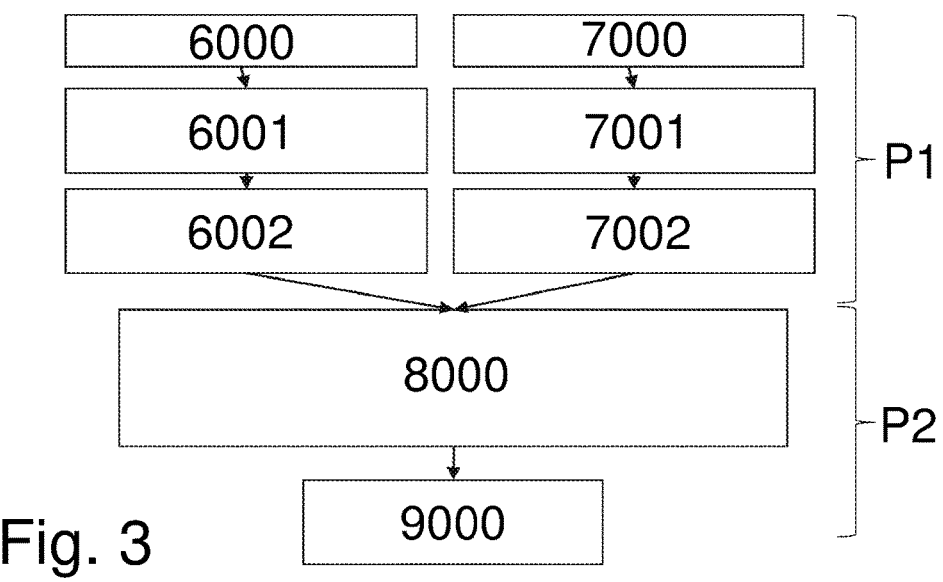
FIG. 3 shows a schematic diagram illustrating methods according to various embodiments of the invention.

A schematic overview of the method according to the embodiments is provided in FIG. 3. Steps 6000-6002 relate to section 6, while steps 7000-7002 relate to section 7, in exemplary manner. In steps 6000 and 7000, pre-assembled shells in the form of the components 101, 103 are provided for each of the sections 6 and 7. Further components such as the third component 104 may additionally be provided, as an individual, still unconnected part.

In steps 6001 and 7001, shell integration is performed, wherein a sealant compound is applied to at least one of the components 101, 103 in the joining region 131 or 133, and an arrangement 100 is formed for each section 6, 7 by positioning the components 101, 103 relative to each other in their target positions.

Thereby, a still uncured layer 121 of sealant 119 is formed between the associated joining regions 131, 133. The joining regions 131 and 133 are clamped to each other and the clamping is maintained until the sealant layer 121 has cured at least to a pre-defined degree. The clamping during curing ensures that the sealant layer thickness requirements are met. Accordingly, in steps 6002 and 7002, sections 6 and 7, respectively, are obtained wherein the components are connected at the longitudinal joints 16 and 17 by the sealant layer 122 that is cured to a pre-defined and appropriate degree, but in which the joints 16 and 17 have not been finally completed by installing the complete set of final fasteners. In other words, at least the greater part of the entire set of final fasteners has not yet been installed at each of the joints 16 and 17. Some adhesive connection at the joints 16, 17 may be provided by the sealant 119.

In step 8000, the sections 6 and 7 obtained in steps 6002, 7002, including the unfinished joints 16, 17, are introduced into an assembly station to finish the joints, e.g., a combined automation station configured for positioning the sections 6 and 7 relative to each other as well as for performing automated drilling and installation of final fasteners at both the orbital joint 67 and/or the longitudinal joints 16 and 17. In such combined automation station, the joints 16, 17 and 67 are completed within a single automated station, configured for drilling a large number of final holes and installing final rivets in these. Sealant may be applied to seal the orbital joint 67 at the combined automation station. Alternatively, the positioning of the sections 6 and 7 relative to each other and the sealant application to seal the orbital joint 67 can be done in a specific station prior to a combined automation station.

Thereby, the number of automated systems necessary can be reduced and an efficient process can be obtained. Further assembly tasks may also be performed in the combined automation station.

Alternatively, the joints 16, 17, 67 can be finished semi-automated and/or manually in step 8000.

Performing steps analogous to 6000-6002, 7000-7002 for all or most sections of the fuselage makes it possible to obtain a fuselage structure 12 in step 9000 that is complete or complete to a large extent.

Part P1 of the process schematically illustrated in FIG. 3, encompassing steps 6000-6002, 7000-7002, is performed at specific production stations for shell positioning and for some remaining assembly tasks, e.g., assembly of a clip or frame coupling. Part P2 in FIG. 3 encompasses steps 8000, 9000 and is performed at the combined automation station and/or subsequent stations.

Figure 4:
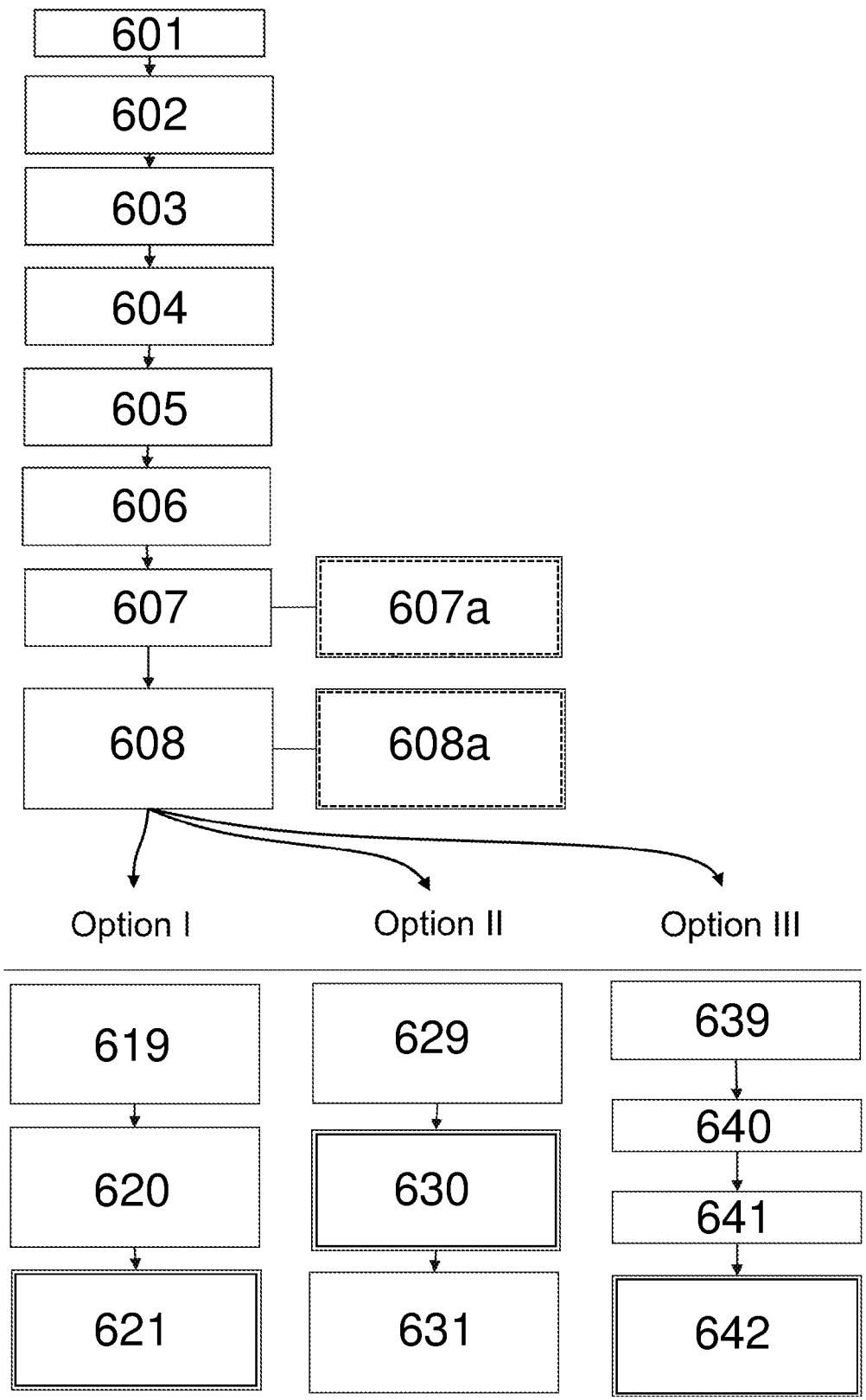
FIG. 4 shows a schematic diagram illustrating methods according to various embodiments of the invention in more detail.

FIG. 4 shows several variants of a method for assembling the structure 12 in more detail. Steps illustrated in FIG. 4 are described below referring to the first fuselage section 6 and the longitudinal joint 16, 116, but these steps apply in analogous manner to the second fuselage section 7 and the joint 17, or to other sections of the fuselage with corresponding joints.

In step 601, the components 101, 103 are positioned relative to each other in their target positions and preliminary holes of non-final dimension, having a diameter smaller than a specified final diameter, are drilled at a pre-defined and comparatively small fraction, e.g., about 10 percent or similar, of the entire set of fastening positions that have been defined during the design of the section for installation of fasteners such as rivets along the joint 116. After the pre-drilling in step 601, the joint 116 is opened again in step 602. The step 601 can include pre-drilling of preliminary holes in the skin 10 as well as in a clip and/or crackstopper and/or stringer 9.

Then, in step 603, chips and burrs resulting from the pre-drilling at the interface between the associated joining regions 131, 133 are removed, the interface, in particular the opposing surfaces of the joining regions 131, 133, is cleaned, and the sealant compound is applied to at least one of the joining regions 131, 133. The opposing surfaces preferably are activated before applying the sealant.

In step 604, the components 101, 103 are realigned to re-position them in the target positions relative to each other.

The joining regions 131, 133 are tacked to each other using a tacking assembly at each or a fraction of the preliminary holes in step 605. For the tacking, preferably about 10 percent or similar tacking points may, for example, be used per frame bay at a longitudinal joint 16, 17.

In the subsequent step 606, one or more clamping devices or fast-clamping template(s) is/are installed using elements of the tacking assemblies at the tacking points. Alternatively or in addition additional tacking assemblies are installed at each or a fraction of the preliminary holes together with the clamping devices or fast-clamping template(s).

Curing of the sealant occurs in step 607. During the period of curing, which may last e.g., approximately 12 hours to approximately 30 hours (depending on the sealant type used and suitability to perform clamping device or fast-clamping template(s) installation) further work may be performed parallel to the curing and/or before removing the fast-clamping template(s). For example, additional elements can be fastened on one or both of the shell-type components 101, 103 in step 607*a*, e.g., by riveting a frame coupling to the segments of the frame 8 that are to be connected and/or by riveting a clip to the frame 8.

In step 608, the clamping devices or fast-clamping template(s) is/are de-installed when the sealant has cured to the pre-defined degree, which may, for example, be defined by a hardness threshold. For example, the template(s) may be de-installed if the Shore A hardness exceeds 30. The sealant in this state adhesively bonds the components 101, 103 in the overlapping joining regions 131, 133 at least to some degree. In step 608, the joining regions 131, 133 still remain tacked or partially tacked. The clip may be riveted to one of the stringers 9 before removing the clamping template(s) or if the clamping templates have been removed in step 608*a*.

After completion of step 608, the method may proceed according to one of several variants. Whether option I, II or III, or a combination thereof, is selected may depend on the components that are joined and on the suitability of the arrangement for drilling and installation of fasteners without any tacking, and/or on loading requirements for transport means such as a crane or a transport vehicle, or both.

Option I: In step 619, all of the tacking assemblies serving as temporary fasteners are de-installed from the preliminary holes. The preliminary holes may be cleaned. Then, in step 620, the section 6 in which the joining regions 131, 133 are not tacked any more, i.e., in which none of the pre-defined fastening positions are tacked and the adjoining regions 131, 133 are essentially held together by the sealant layer, is loaded into the combined automation station, along with the first section 7, prepared in analogous manner. In step 621, the automated station performs automated drilling of final holes at all of the pre-defined set of fastening positions within the adjoining regions 131, 133 so as to obtain holes of final dimension at each of these positions, and further performs installation of the final fasteners at all of these positions in an automated manner. In order to do so, the automated station performs, in step 621, secondary drilling at the positions of the preliminary holes which have been used for tacking, by enlarging the preliminary holes to reach the final diameter, and further performs one-shot drilling into the full material at the other positions where no pre-drilling and tacking has been carried out. Because the number of preliminary holes and hence of positions at which secondary drilling is performed is comparatively small, for example 10 percent, and drilling into full material can be performed at approx. 90 percent of the positions, a highly efficient automated process is obtained.

Option II: Subsequent to step 608, in step 629 the section 6 is loaded into the combined automation station, together with a further section 7 prepared in analogous manner. In step 629, the joining regions 131 and 133 still remain tacked. Then, in step 630, at fastening positions pre-defined for the joint 116 where no tacking has been carried out, one-shot drilling of holes of final dimension and installation of final fasteners are performed in automated manner. In a subsequent step 631, the tacking assemblies are removed from the tacking positions, and secondary drilling to enlarge the preliminary holes to the final diameter is performed at each of the positions previously used for the tacking. The secondary drilling is performed, in step 631, in particular manually, and can be performed at a manufacturing station subsequent to the combined automation station. The removal of the tacking assemblies can also be performed at that subsequent station. In each of the holes enlarged by secondary drilling, a final fastener is installed, in particular, manually.

Option III: In step 639, following step 608, the tacking assemblies are de-installed, the preliminary holes may be cleaned, and subsequently, in step 640, secondary drilling is performed at the positions previously used for tacking. In particular, the secondary drilling in step 640 may be carried out manually. Further, in step 640, final fasteners are installed in the enlarged holes at the positions used for tacking, e.g., manually as well. Afterwards, in step 641, the section 6 in which the joining portions 131, 133 are adhesively connected by the sealant layer cured to the predefined degree, and additionally by the number of final fasteners installed at a comparatively small part of the entire set of fastening positions, i.e., those used for tacking, is loaded into the combined automation station, together with a further section 7, which has been prepared in analogous manner. In step 642, at the remaining, larger fraction of the fastening positions pre-defined at the joint 116 and not used for the tacking, one-shot drilling of holes of final dimension into the full material and installation of the final fasteners in each of these final holes are performed in automated manner in the combined automation station.

Combinations of the options I, II, III are possible as well. In other words, not all of the fastening positions 106 used for tacking must necessarily be treated in the same way, but some thereof might be handled in automated manner as in option I, while at others the connection might be completed via manual or partially manual secondary drilling and manual or partially manual installation of a final fastener subsequent to or ahead of the combined automation station, as in options II or III.

A first embodiment is described in the following in more detail with reference to FIGS. 5 to 16, along with variants thereof.

Figure 5:
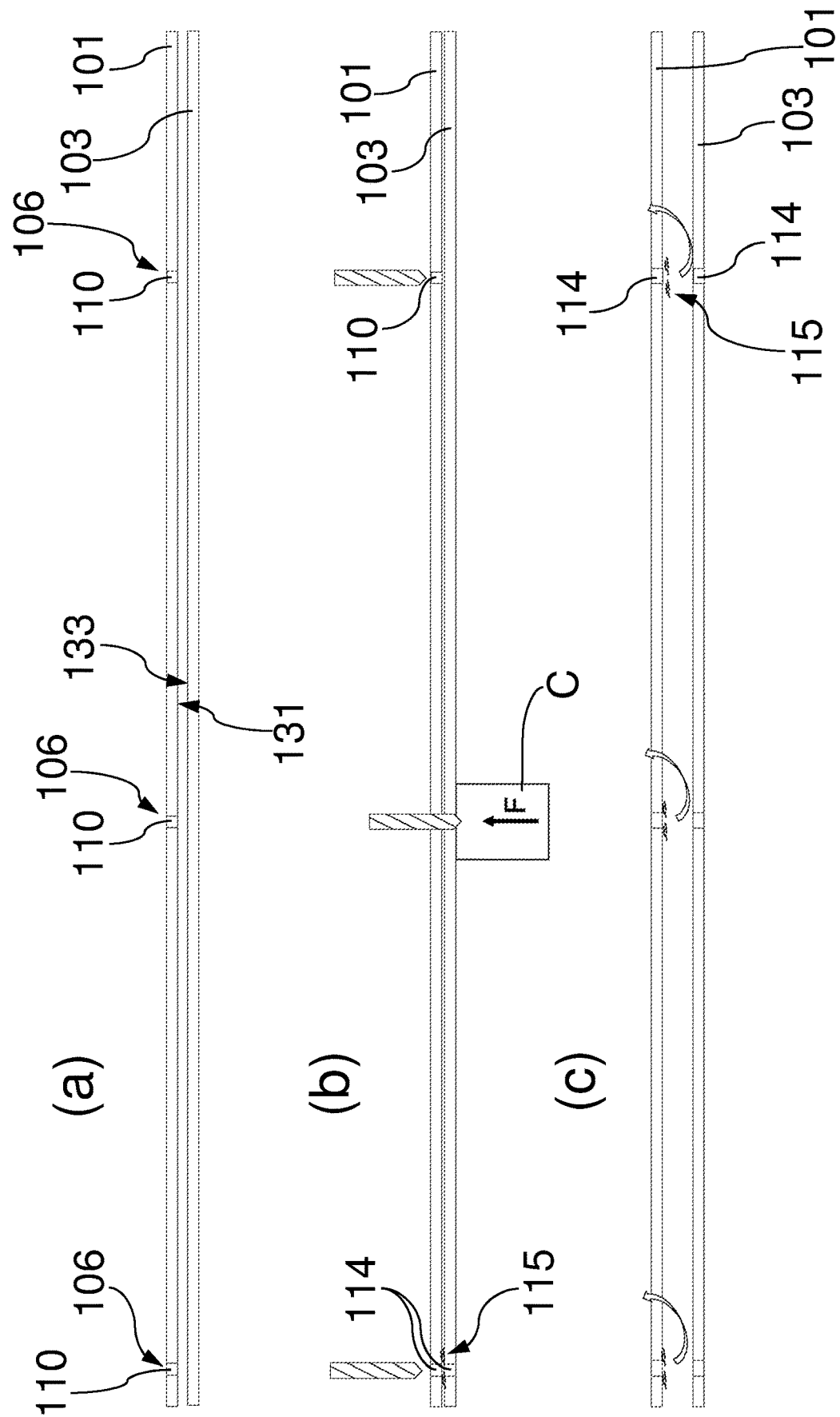
FIG. 5 illustrates steps of positioning two components, pre-drilling, deburring and cleaning, in a method according to a first embodiment, in sectional view.

At (a) and (b), FIG. 5 illustrates step 601. As schematically illustrated in FIG. 5 at (a), the first and second components 101 and 103 are provided, with the first component 101 comprising pilot holes 110 at fastening positions 106. Three pilot holes 110 are shown in FIG. 5 (a) in exemplary manner. In FIG. 5, sheet-like joining regions 131, 133 of the components 101, 103, respectively, are shown and may correspond to overlapping sheet-like portions of fuselage shells that are intended to be connected. One or both of the joining regions 131, 133 may be formed each with a portion of the skin 10. In particular, one joining region, e.g., 131, may be formed with a portion of the skin 10 in an upper shell 101 and the other joining region 133 may be formed with a portion of a crackstopper as an element of the shell 103.

The components 101, 103 are temporarily aligned and positioned relative to each other in relative target positions. At (b), FIG. 5 shows that the pilot holes 110 in the joining region 131 are transferred by drilling to the joining region 133 of the second component 103. At each of the fastening positions 106, a preliminary hole 114 is obtained, the diameter of which is smaller than the diameter of a final hole which will be introduced at a later step and will be used later for installation of a final fastener.

In order to obtain holes of good quality, a counter force F is applied from the side of the second component 103, using a counter support C, while drilling is performed from the side of the first component 101. FIG. 5 (b) shows, from right to left, that the drilling location is determined by the pilot hole 110, which is transferred to the second component 103 by a first worker by drilling, while the counter force F is applied e.g., by a second worker. In this manner, sheet misalignment can be prevented. After the pilot hole 110 has been transferred, chips 115 can remain at the interface between the components 101, 103. FIG. 5 (c) shows that after the completion of the pre-drilling, the interface between the joining regions 131, 133 is opened again for removal of the chips 115, denoted above by steps 602-603.

Figure 6:
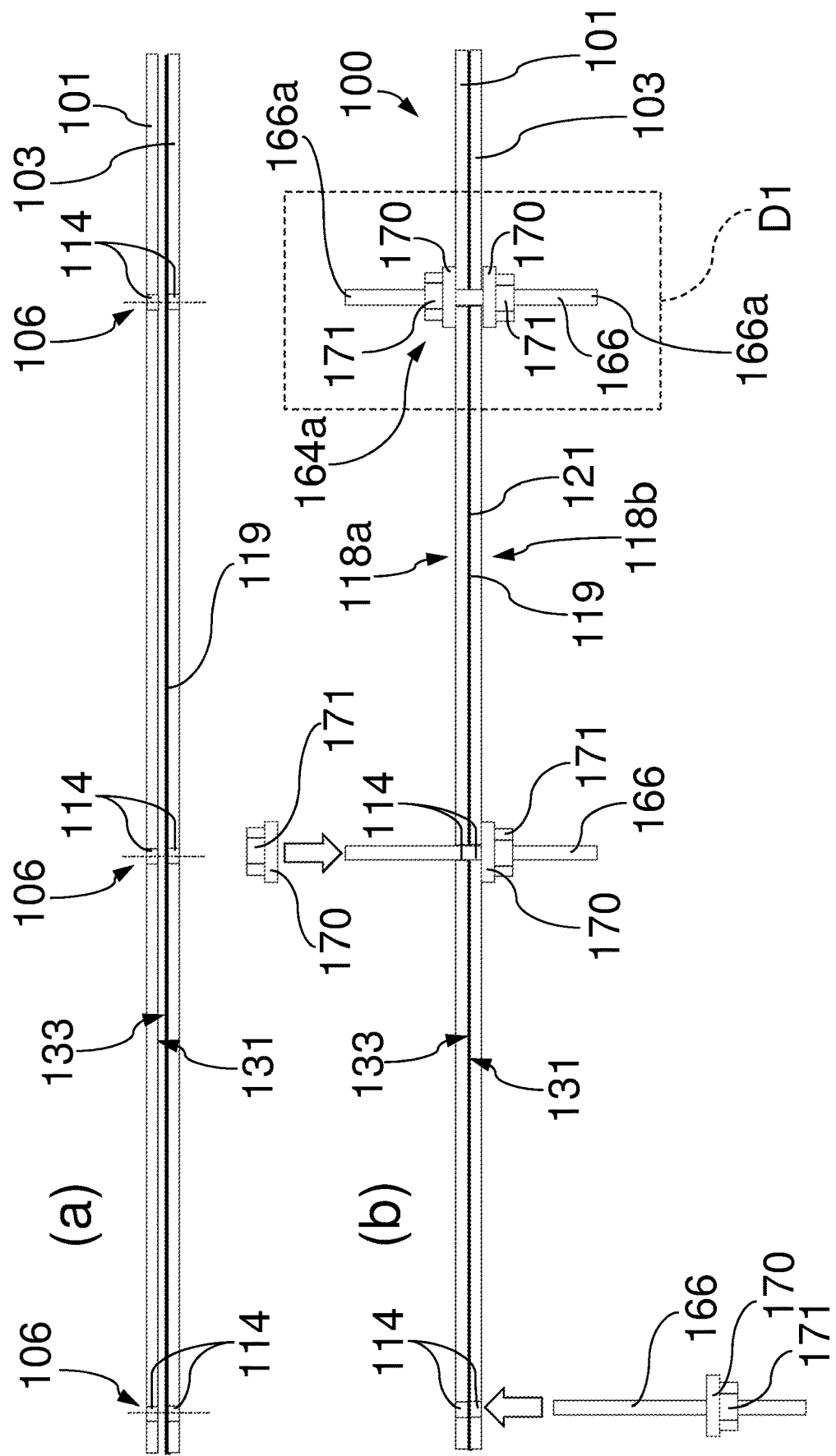
FIG. 6 illustrates steps of applying a sealant compound to one of the components, re-positioning the components to form an uncured layer of sealant between associated joining regions, and tacking the components at exemplary tacking locations, in the method of the first embodiment, in a sectional view.

After opening the interface, see FIG. 6 at (a), the components 101, 103 are deburred and the opposing surfaces of the joining regions 131, 133 are activated and cleaned, and a sealant compound 119 is applied to the joining region 133, corresponding to step 603.

It may be noted that in case the components 101, 103 are delivered, at the beginning of the process, with the preliminary holes 114 already provided at the appropriate positions, the pre-drilling step to transfer the pilot holes 110, as well as the opening of the joint 116, removal of chips 115 and deburring can be omitted. In this case, it may be sufficient to clean and activate the opposing surfaces of the joining regions 131, 133 before the sealant 119 is applied, unless this has been performed beforehand, and to proceed with step 604.

Furthermore, if appropriate clamping of the overlapping joining regions 131, 133 during pre-drilling of the preliminary holes 114 is ensured and capable of preventing contamination of the interface, for instance using one or more devices not shown in the figures, it may not be necessary to re-open the joint 116 for removing chips 115 and burrs. Instead, the sealant 119 may in this case be applied before the joining portions 131, 133 are positioned and pre-drilled as in FIG. 5 at (a) and (b). In such a variant, the opposing surfaces of the joining regions 131, 133 which the sealant 119 should contact are cleaned and activated before applying the sealant compound 119 ahead of the pre-drilling step of FIG. 5 (b). After pre-drilling, the process proceeds to step 605, see FIG. 6 at (b).

An arrangement 100 is formed by aligning or re-aligning the components 101, 103, step 604, see FIG. 6 at (b), and thus arranging the components 101, 103 in their relative target positions. An uncured layer 121 of sealant 119 is thereby formed which contacts and extends between the opposing surfaces of the associated joining regions 131, 133.

In line with step 605, the components 101, 103 are tacked to each other at each of the fastening positions 106 using a tacking assembly 164a. The tacking assembly 164a comprises a coupling element configured as the threaded rod 166, as well as washers 170 made from e.g., a synthetic material and nuts 171 adapted to threadingly engage, the rod 166. In FIG. 6 at (b), the insertion of the coupling element 166 into the preliminary hole 114 is shown, with a nut 171 already threaded onto the rod 166 and a washer 170 arranged on the upper side of the nut 171. Next, FIG. 6 (b) shows, at the center, a second washer 170 and a second nut 171 being arranged and threaded, respectively, onto the rod 166 from the side of the first component 101. On the right, a detail D1 displays a completed tacking assembly 164a, with the washers 170 abutting on the arrangement of components 101, 103 on a first side 118a and a second side 118b of the joint 116, the second side 118b being opposite the first side 118a. The nuts 171 shown in detail D1 are tightened against the washers 170 on the rod 166 from the opposite sides 118a, 118b, whereby a compression force is applied to the components 101, 103 at the position 106. D1 illustrates that the joining regions 131, 133, with the layer 121 of sealant 119 therebetween, are clamped to each other at the positions of the preliminary holes 114 using the tacking assembly 164a. The rod 166 may comprise a metric thread M2.5 or M3, or an imperial thread 5-44 UNF thread, for example. The nuts 171 and the rod 166 are, e.g., formed from metal. Preferably, the rod 166 has a high strength.

FIG. 7 shows the installation of a clamping device 155a, indicated above by step 606. FIG. 7 shows in exemplary manner three tacking assemblies at three of the fastening positions 106. An associated one of the coupling elements 166 extends through each of the preliminary holes 114 in FIG. 7.

The clamping device 155a comprises the tacking assemblies 164a at the fastening locations 106 as well as a first clamping device part 157a arranged on the first side 118a, and a second clamping device part 158a, arranged on the second side 118b.

The part 158a can be an inner clamping device part, while the part 157a can be an outer clamping device part. Each of the first and second clamping device parts 157a and 158a is adapted to apply a plurality of individual forces at a multitude of clamping force application locations 178 onto the arrangement 100. Specifically, the first clamping device part 157a applies a plurality of individual forces FC onto an outer side of the joining region 131 of the first component 101 from the first side 118a, and the second clamping device part 158a applies a plurality of individual forces FC acting onto an outer side of the joining region 133 of the second component 103 from the second side 118b. The clamping force application locations 178 are located within the joining regions 131, 133. In FIG. 7, each of the device parts 157a, 158a is capable of applying an individual clamping force FC at each clamping force application location 178, wherein some or all of the clamping forces FC may differ. The clamping force FC is preferably individually adjustable for each application location 178.

Using the clamping device 155a, the associated joining regions 131 and 133 are clamped against each other and are maintained in the clamped state at least until the layer 121 of sealant has cured to a predefined degree, for example reaches or exceeds a Shore A hardness of 30. The clamping during curing ensures that the layer 121 does not exceed a maximum predefined layer thickness, for example 50 μm, after curing at least in the region of each intended fastening position, which may correspond to the force application locations 178. FIG. 7 shows that using the clamping device 155a, it is not necessary to tack the components 101, 103 at an excessive number of fastening locations and only few preliminary holes 114 are required. A very flexible process is obtained which is not restricted by a requirement of drilling and riveting through uncured, wet sealant, using the final fasteners, within a narrow timeframe as long as the sealant compound is still wet. The time between the application of the sealant, e.g., in steps 6001, 7001, and the completion of the joints in step 8000 can therefore be significantly longer than the period that would be appropriate for installing the final fasteners through the wet sealant layer. In this manner, the implementation of a combined automated process of drilling and final fastening, in particular, at a large number of positions at the longitudinal and orbital joints 16, 17, 67 is significantly facilitated.

As the clamping device 155a applies the clamping forces FC, reaction forces FS arise which are supported on the arrangement 100 using the tacking assemblies 164a. Only one of the reaction forces FS is schematically indicated in FIG. 7 as a force acting on the part 157a. Each clamping device part 157a, 158a has a number of openings 160 corresponding to each of fastening positions 106, each of the openings 160 being slightly larger than an outer diameter of the rod 166. Through each of the openings 160, one of the rods 166 can be inserted with its free end 166a. A nut 173 is threaded onto the end 166a and tightened against the clamping device part 157a or 158a, with a plastic washer 172 analogous to the washer 170 being arranged between the nut 173 and the part 157a or 158a. Each of the openings 160 may, as shown in FIG. 7, be formed slightly conical to facilitate the insertion of the rod 166.

The clamping device 155a is supported on the arrangement 100 by tightening the nuts 173, is thereby coupled to the arrangement 100 and installed thereon, and can be easily and flexibly transported along with the arrangement 100, which may be an arrangement of shells corresponding to an entire section 6 or 7. The device parts 157a and 158a may be designated as fast-clamping templates. A mechanical connection through the components 101, 103 is provided between the device parts 157a, 158a via the coupling elements 166 extending through the holes 114.

While the clamping device 155a is installed and curing of the sealant compound 119 is in progress, additional work such as further assembly tasks may be carried out on the arrangement 100. For example, parallel to curing or before removing the parts 157a, 158a, a frame coupling, not shown in the figures, may be riveted to adjacent frame segments of frame 8, and/or a clip, not shown in the figures may be riveted to the frame 8. Furthermore, before the parts 157a, 158a are removed, or afterwards, the clip already riveted to the frame 8 can also be riveted to a stringer 9.

Figure 9:
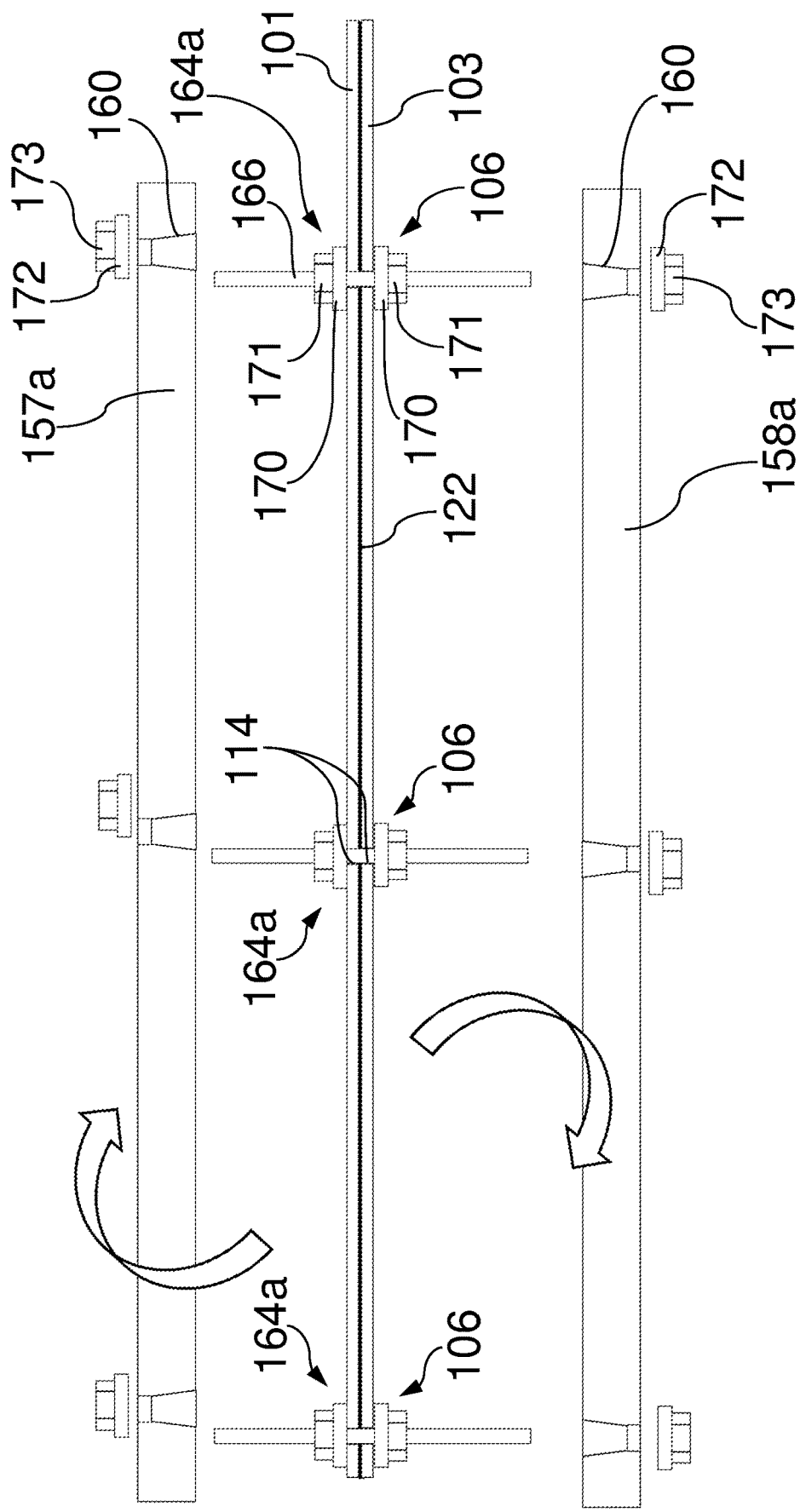
FIG. 9 illustrates a step of removing clamping device parts after the layer of sealant has cured to a pre-defined degree, in a sectional view.

Step 608 is illustrated more in FIG. 9 for the first embodiment. The first clamping device part 157a, which may be an inner clamping template with respect to the section 6, and the second clamping device part 158a, which may be an outer clamping template with respect to the section 6, are removed after the sealant layer 122 is sufficiently cured. In FIG. 9, the joining regions 131, 133 are still tacked via the tacking assemblies 164a.

The entire set of fastening positions defined for fastening in the joining regions 131, 133 encompasses a plurality 205 of first fastening positions 105 and a plurality 206 of second fastening positions, wherein the second fastening positions correspond to the tacking positions 106.

Figure 10:
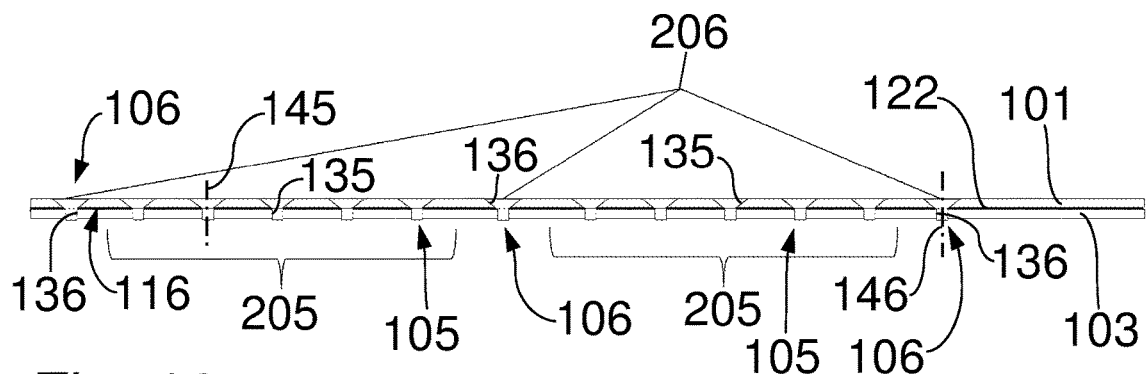
FIG. 10 illustrates drilling and installing final fasteners in automated manner at first and second fastening positions, according to a second variant of the first embodiment, in a sectional view.

FIG. 10 illustrates Option I, steps 619-621. After de-installing the tacking assemblies 164a completely, final holes 135 and 136 are drilled in automated manner, e.g., at a combined automated station, at all of the positions 105 and 106, respectively, and final fasteners 145, 146 such as rivets are installed in an automated way at all these positions. In order to do so, automated drilling into full material, so-called one-shot drilling, followed by automated fastening using the final fasteners 145 is carried out at the first fastening positions 105. At the second fastening positions 106, so-called secondary drilling, whereby the preliminary holes 114 are enlarged to reach the intended final diameter, followed by installing of the final fasteners 146 is carried out. FIG. 10 shows the drilled final holes 135, 136 and schematically indicates a few final fasteners 145, 146.

Figure 11:
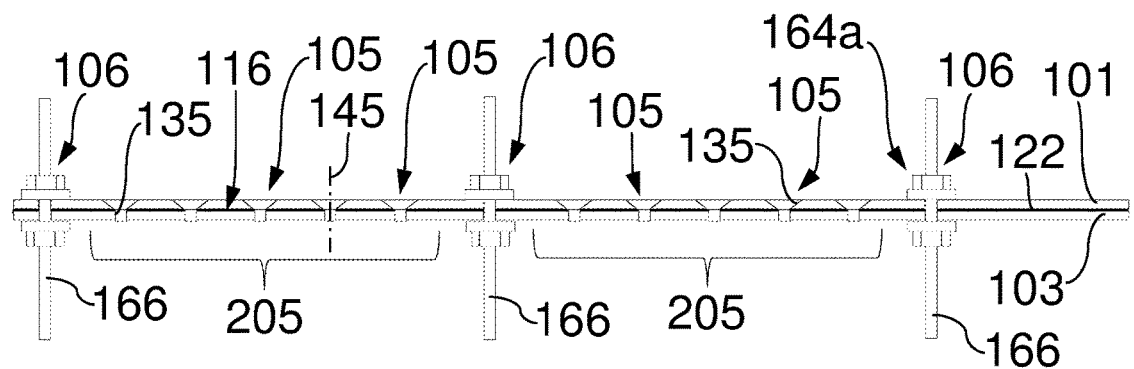
FIG. 11 illustrates drilling and installing final fasteners a first fastening positions, with the components still being tacked at second fastening positions, according to a third variant of the first embodiment, in a sectional view.

FIG. 11 illustrates Option II, steps 629-631. The tacking assemblies 164a remain at the second positions 106 during one-shot drilling of final holes 135 into full material at the plurality 205 of first fastening positions 105, e.g., at the combined automation station, followed by installation of the final fasteners 145 at the positions 105. Afterwards the tacking assemblies 164a are removed, e.g., at a subsequent manufacturing station, secondary drilling to enlarge the holes 114 is performed manually or partially manually at the second positions 106, and final fasteners 146 are manually or partially manually installed at the positions 106. FIG. 11 shows the drilled final holes 135 before insertion of the final fasteners 145, the components still being tacked at the positions 106.

Figure 12:
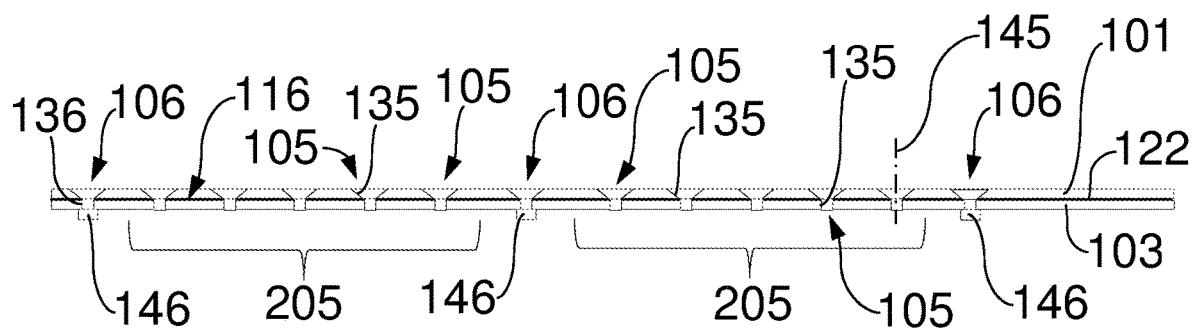
FIG. 12 illustrates drilling and installing final fasteners at first fastening positions, with the components already being connected by final fasteners installed previously at second fastening positions, according to a fourth variant of the first embodiment, in a sectional view.

FIG. 12 illustrates Option III, steps 639-642. The tacking assemblies 164a are de-installed after removal of the device parts 157a, 158a, and a manual or partially manual process of secondary drilling at the plurality 206 of second fastening positions 106 to obtain final holes 136 as well as installation of final fasteners 146 in the final holes 136 is performed. Accordingly, the components 101, 103 are already finally connected at the second positions 106 when one-shot drilling at the plurality 205 of the first fastening positions 105 to obtain the final holes 135 and the subsequent installation of the final fasteners 145 in the holes 135 are performed, e.g., at the combined automation station. FIG. 12 shows the drilled final holes 135, 136 and the installed final fasteners 146, while one final fastener 145 to be installed is schematically depicted.

The drilling in order to enlarge the preliminary holes 114, and the drilling of final holes 135 in one-shot manner, is carried out in a state in which the layer 122 of sealant is cured at least to the pre-defined degree. Accordingly, the gap at the interface of the joining regions 131, 133 is closed, the components 101, 103 are bonded in these regions, and the drilling can be performed without chips or burrs penetrating between the components 101, 103. A counter support for the drilling and/or fastener insertion hence may in some variants not necessarily be required at this stage.

The manual, partially manual or automated installation of a final fastener 145, 146 may be performed directly after drilling a single final hole 135, 136 or may be performed after drilling a plurality of several final holes 135, 136.

Figure 13:
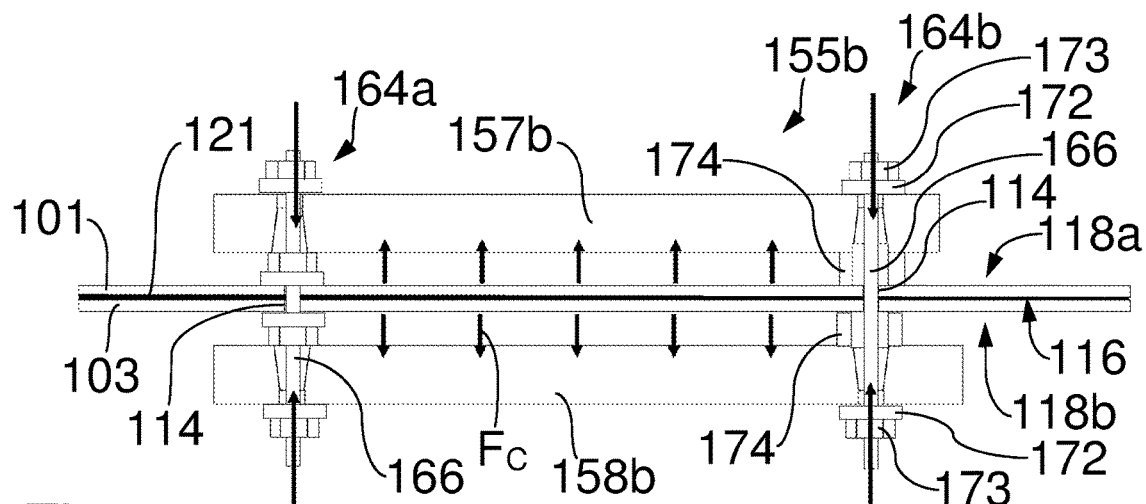
FIG. 13 shows an clamping device installed in accordance with a fifth variant of the first embodiment, in sectional view.

FIG. 13 illustrates a variant of the first embodiment in which tacking the components 101, 103 in the joining regions 131, 133 is performed in a modified manner. In FIG. 13 on the left, a preliminary hole 114 is shown where tacking is performed using a tacking assembly 164a as described above. At another tacking position 106, shown on the right in FIG. 13, a different tacking assembly 164b is used, which differs from the assembly 164a in that the washers 170 and nuts 171 tightened against the components 101, 103 are replaced by annular elements 174, e.g., configured as spacer sleeves which may part of clamping devices 157b, 158b, abutting on the arrangement 100 from either side thereof. Hence, tacking by the tacking assembly 164b is accomplished when first and second clamping device parts 157b, 158b, substantially corresponding to parts 157a, 158a, are placed on the rod 166 and tightened against the annular elements 174 and the arrangement 100 using the nuts 173 and the washers 172. The tacking assemblies 164a, 164b can be combined in one clamping device 155b, see FIG. 13, or a clamping device including only tacking assemblies 164b may be used.

FIGS. 7 and 13 show individual clamping forces FC being applied from the first, outer side 118a and from the second, inner side 118b of the joint 116. Regarding the tacking assembly 164b, the tightening torque applied to the nuts 173 takes account of reactions forces resulting from the clamping forces FC which reduce the tacking force at the location of the tacking assembly 164b in FIG. 13, in order to apply sufficient tacking there.

Figure 14:
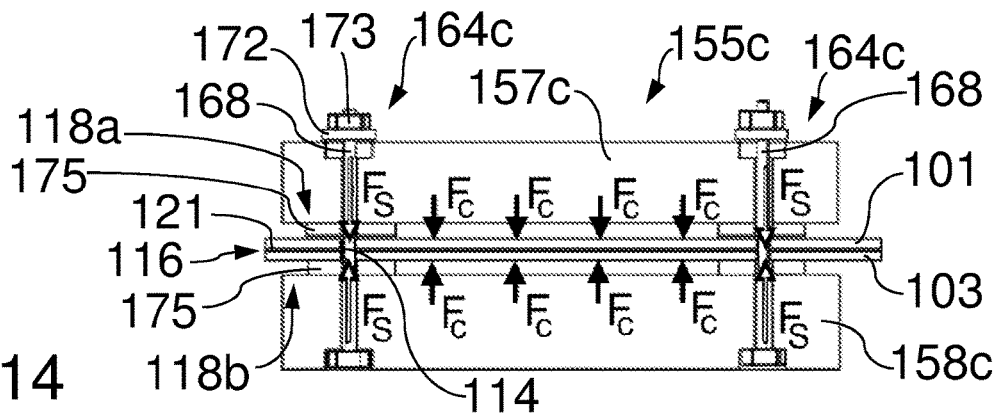
FIG. 14 illustrates an installed clamping device with clamping device parts adapted to apply a plurality of individual forces from opposite sides of the joining regions, in a sectional view, in a sixth variant of the first embodiment, in a sectional view.

In a variant illustrated in FIG. 14, clamping forces FC are applied from both sides 118a, 118b as well. FIG. 14 shows a clamping device 155c comprising clamping device parts 157c, 158c. Coupling elements 168 are inserted through the preliminary holes 114 at the second fastening positions 106, but different from FIGS. 6-9 and 13, the coupling elements 168 are each configured as bolts or screws comprising a head at one end thereof, in FIG. 14 at the lower end. Tightening is carried out using a single washer and a single nut for each coupling element 168, the nut 173 being threaded on the screw 168 from the first side 118a. Between each device part 157c, 158c and the arrangement 100, a washer-like annular element 175 is disposed or integrated to clamping devices 157c, 158c. Tacking at the positions 106 is performed in FIG. 14 when the nuts 173 are tightened, and at the same time, the clamping forces FC are applied. The clamping device 155c comprises tacking assemblies 164c, each formed with the screw 168, the elements 175, the washer 172 and nut 173 in cooperation with the device parts 157c, 158c. The nuts 173 are tightening in a manner taking account of reaction forces FS in order to apply sufficient tacking by the assemblies 164c.

Figure 15:
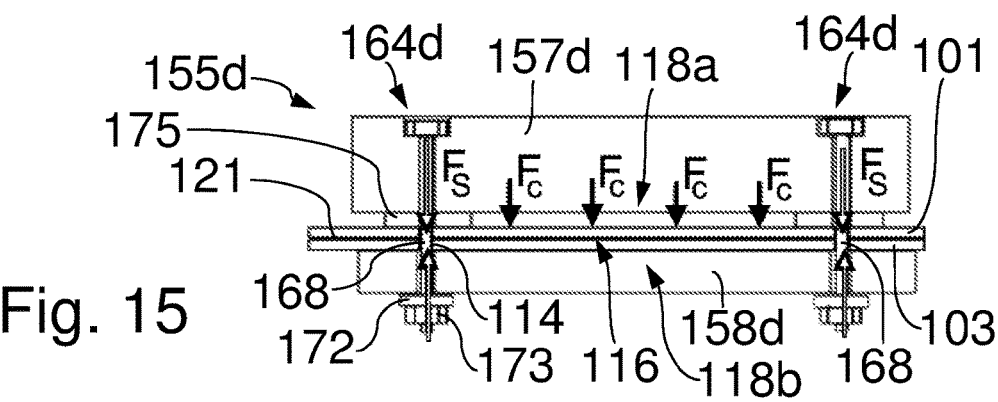
FIG. 15 illustrates an installed clamping device comprising a common rigid counter support bar, in a seventh variant of the first embodiment, in a sectional view.

FIG. 15 shows a variant including a clamping device 155d, which differs from the device 155c in that one of the clamping device parts is replaced by a common rigid counter support part 158d. The counter support part 158d is arranged on the second side 118b, while a clamping device part 157d corresponding the clamping device part 158c of FIG. 14 is arranged on the first side 118a. A plurality of individual, in some examples separately adjustable, clamping forces FC are applied from the first side 118a, while on the second side, pressure across an outer surface of the second component 103 in the joining region 133 is provided by the common rigid counter support part 158d, which may be a metal bar comprising through-holes for a shaft of each screw 168. Also in FIG. 15, tacking is accomplished using tacking assemblies 164d at the time of clamping by tightening the nuts 173.

Figure 16:
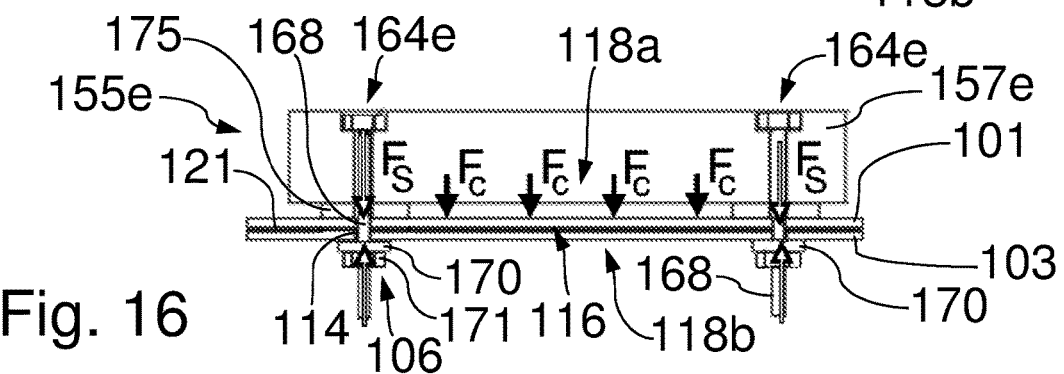
FIG. 16 illustrates an installed clamping device comprising individual retaining pieces, in an eighth variant of the first embodiment, in a sectional view.

In FIG. 16, a variant is shown including a clamping device 155e comprising a clamping device part 157e corresponding to the device part 157d of FIG. 15, which is supported on the arrangement 100 using an annular element 175 at each second fastening location 106. While in FIG. 15, a backing bar 158d is provided in the form of the counter support part 158d, in the variant of FIG. 16, washers 170 directly abut on an outer surface of the second component 103 in the joining region 133, from the second side 118b. Tacking is carried out by tightening nuts 171 on the second side 118b. In FIG. 16, there is no backing bar, and the clamping device part 157e, adapted to apply individual forces FC, is coupled to the arrangement 100 via the screws 168, and via the washers 170 and nuts 171 acting as retaining pieces at the fastening positions 106, for tacking and for supporting reaction forces resulting from the application of the clamping forces FC.

The plurality 206 of second fastening positions 106 corresponds to a comparatively small fraction of the entire set of positions where fastening is to be carried out. For example, the plurality 206 corresponds to approximately 10 percent of the entire set of positions, while the plurality 205 of first fastenings positions corresponds to approximately 90 percent thereof. This enables a sufficient number of holes 114 for load transfer between the inner and outer sides 118b, 118a through the components 101, 103. However, the number of second fastening positions 106 and preliminary holes 114 can be modified and may be more or less than 10 percent.

While, for example, it is shown in FIG. 9 to remove both clamping device parts 157a, 158a before performing drilling, it is conceivable to remove only one of the device parts 157a, 158a, while the other one remains coupled to the arrangement 100 in order to serve as a counter support for drilling the final holes 135, if desired. The remaining clamping device part may be adapted accordingly.

As in FIGS. 13-16, clamping and tacking are performed at the same time using the assemblies 164b-e, the clamping device parts 157b-e, 158b-d are removed after the sealant layer 122 has cured to a sufficient degree, and the tacking assemblies 164b-164e are de-installed along with the removal of the device parts 157b-e, 158b-d. In the variant of FIG. 13, if desired, the tacking assembly 164a may temporarily remain in a manner analogous to FIG. 11. Further, in the case of FIG. 8, the tacking assemblies 164a may, if desired, be removed along with the device part 158a if the rod 166 as well as nuts and washers 170-173 should remain connected to part 158a.

Using the clamping devices 155a-e, the region of each drilling point or fastening position can be loaded with a specific clamping force during curing of the sealant 119. In the area of the tacking positions 106, a clamping force sufficient to ensure the required maximum sealant layer thickness is applied by installing and tightening the tacking assemblies 164a-e accordingly.

Figure 17:
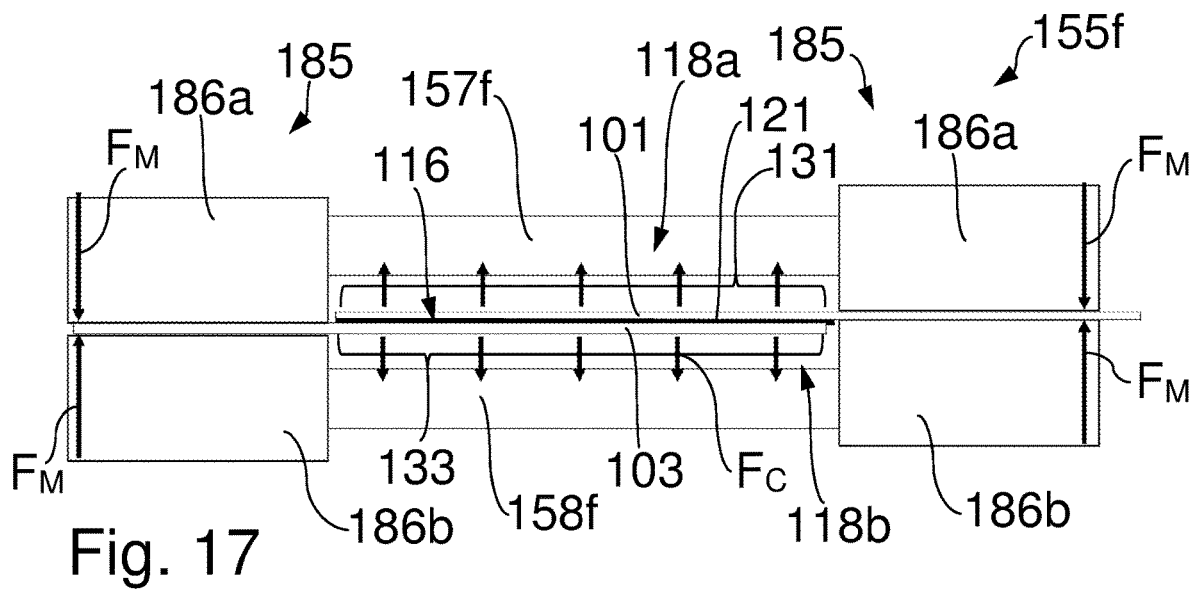
FIG. 17 shows an installed clamping device in a method of a second embodiment, using magnetic forces, in a sectional view.

A clamping device 155f in accordance with a second embodiment is shown in FIG. 17. The clamping device 155f comprises a first clamping device part 157f and a second clamping device part 158f each adapted to apply a plurality of individual clamping forces FC onto the components 101, 103 in the joining regions 131, 133 as described above. However, the clamping device 155f is not coupled to the arrangement 100 using a mechanical connection established via preliminary holes. Instead, in FIG. 17, forces for coupling the device parts 157f, 158f on the arrangement 100 and for accomplishing the clamping and for supporting reaction forces resulting from the individual forces FC are transferred through the components 101, 103 in a magnetic manner. In exemplary manner, FIG. 17 shows two magnetic device parts 186a coupled to the clamping device part 157f at the ends of the latter, on the first side 118a. In analogous manner, two magnetic device parts 186b are coupled to the clamping device part 158f on the second side 118b. Corresponding ones of the magnetic device parts 186a and 186b, arranged opposite to each other with a portion of one of the components 101 or 103 therebetween, form a magnetic device 185. For example, the parts 186a can each be configured with a permanent magnet or with an electromagnet. The parts 186b can each be configured, for example, with a ferromagnetic core, so that the magnet in part 186a may exert a magnetic attraction force FM onto the part 186b. Alternatively, both parts 186a, 186b may be configured with permanent magnets or electromagnets in such a manner as to enable a magnetic attraction force FM between the parts 186a, 186b of each magnetic device 185.

Preferably, the magnetic devices 185 are arranged in regions of the arrangement 100 where the components 101 and 103 are comparatively thin, further preferably outside of the joint 116 but next to it, for effective magnetic coupling of the magnetic device parts 186a-b.

In a method in line with the embodiment of FIG. 17, it is not necessary to provide preliminary holes 114. Accordingly, steps 601-605 in FIG. 4 may be reduced in such an embodiment to cleaning and activating the opposing surfaces of the joining regions 131, 133, applying the sealant compound 119 and positioning the components 101, 103 to form the joint 116. In a modified step 606, clamping the components 101, 103 in the joining regions 131, 133 is accomplished by arranging the clamping device 155f on the arrangement 100 and magnetically coupling the magnetic device parts 186a-b, e.g., by supplying electric current to the electromagnets.

In particular, in accordance with the second embodiment, after the sealant layer 121 has sufficiently cured, the entire clamping device 155f is removed. Then, the arrangement 100, with the joining regions 131, 133 adhesively bonded, can be loaded, e.g., into the combined automation station as described above, and drilling and installation of final fasteners can be carried out at substantially all fastening positions that are pre-defined by the design. In this manner, substantially no secondary drilling may be required and preliminary holes may not be needed. Instead, essentially all final fasteners can be installed following one-shot drilling.

Figure 18:
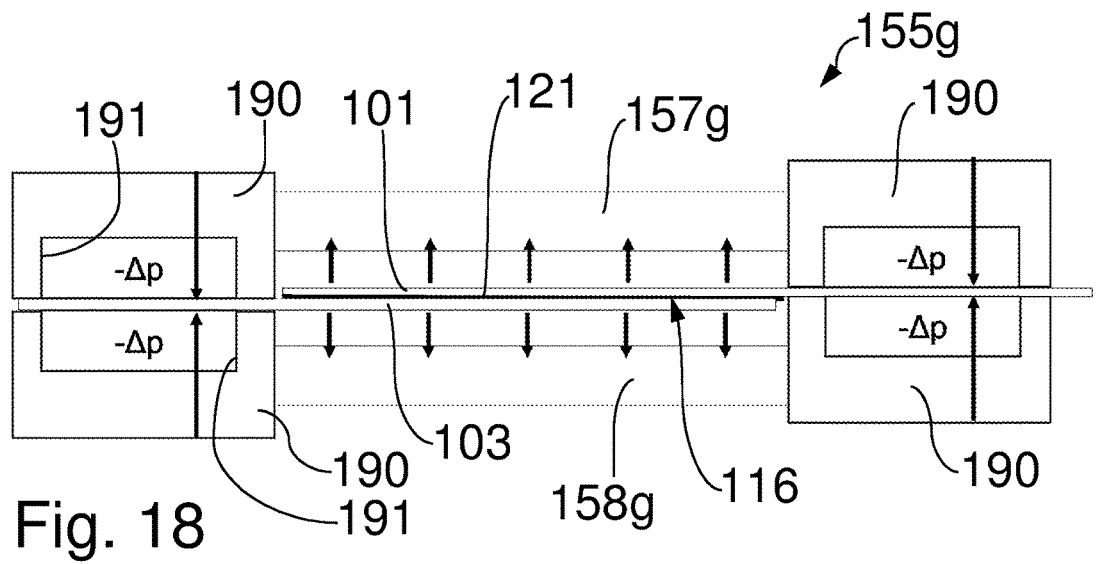
FIG. 18 shows an installed clamping device in a method of a third embodiment, using negative pressure, in a sectional view.

A clamping device 155g according to a third embodiment is illustrated in FIG. 18, comprising first and second clamping device parts 157g, 158g adapted to apply clamping forces FC as in the case of FIG. 17. Instead of magnetic forces, the clamping device 155g is coupled to the arrangement 100 and is retained on the arrangement 100 using vacuum pads 190. In exemplary manner, at least one vacuum pad 190 is coupled to each end of each of the clamping device parts 157g, 158g. The vacuum pads 190 are retained on outer surfaces of the arrangement 100 using a negative pressure difference −Δp relative to the ambient pressure within a cavity 191 of each pad 190.

Within a method according to the third embodiment, the clamping device 155g is used in a manner analogous to the process described above in relation to FIG. 17, without the need for preliminary holes 114, except in that after arranging the device 155g in place, a source of negative pressure is connected to the cavities 191, e.g., via a valve. Preferably, the vacuum pads 190 are arranged in regions of the components 101 and 103, respectively, where a surface thereof is substantially undisturbed or flat, to facilitate sealing the cavities 191 tightly with respect to the environment.

Combinations of the embodiments 155f and 155g according to FIGS. 17 and 18 with variants how to react clamping forces FC according to FIG. 14 and/or FIG. 15 and/or FIG. 16 are possible.

Although the invention has been completely described above with reference to preferred embodiments, the invention is not limited to these embodiments but may be modified in many ways.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 aircraft
2 fuselage
3 nose
4 empennage
5 wing
6 first fuselage section
7 second fuselage section
8 frame
9 stringer
10 fuselage skin
12 fuselage structure
16 longitudinal joint (first fuselage section)
17 longitudinal joint (second fuselage section)
18a outer side (longitudinal joint 16)
18b inner side (longitudinal joint 16)
67 orbital joint
100 arrangement
101 first component
103 second component
104 third component
105 first fastening position
106 second fastening position
110 pilot hole
114 preliminary hole
115 chips
116 joint
118a first side (joint)
118b second side (joint)
119 sealant
121 uncured layer of sealant
122 cured layer of sealant
131 joining region (first component)
133 joining region (second component)
135, 136 hole (final dimension)
145, 146 final fastener
155a-g clamping device
157a-d first clamping device part
157e clamping device part
157f-g first clamping device part
158a-d second clamping device part
158f-g second clamping device part
160 opening
164a-e tacking assembly
166, 168 coupling element
166a end (coupling element)
170, 172 washer
171, 173 nut
174, 175 annular element 178 clamping force application location
185 magnetic device
186a-b magnetic device part
190 vacuum pad
191 cavity
205 pre-defined set of first fastening positions
206 pre-defined set of second fastening positions
601-608 steps
607a step
608a step
619-621 steps
629-631 steps
639-642 steps
6000 step
6001 step
6002 step
7000 step
7001 step
7002 step
8000 step
9000 step
C counter support
D1, D2 detail
F counter force
$F_C$ clamping force
$F_S$ support force
$F_M$ magnetic force
P1, P2 parts of process
X longitudinal direction (aircraft)

The invention claimed is:

1. A method of assembling a structure in aircraft or spacecraft production, comprising:
   providing a plurality of components to be joined to each other at a joint to form a structural assembly, each of the components comprising a joining region;
   applying sealant to at least one of the components in the joining region thereof;
   forming an arrangement by positioning the components relative to each other, whereby an uncured layer of the sealant is formed between associated joining regions;
   clamping the associated joining regions against each other to achieve a clamped state using at least one clamping device and maintaining the clamped state of the associated joining regions at least until the layer of sealant therebetween and contacting the associated joining regions has cured to a pre-defined degree, the clamping device being installable on and transportable along with the arrangement; and
   after the layer of sealant has cured at least to the pre-defined degree, performing drilling at at least a plurality of fastening positions within the joining regions to obtain a hole of final dimension at each of the plurality of fastening positions, and performing installation of a final fastener at each of the fastening positions,
   wherein clamping forces are applied using the at least one clamping device part arranged on a first side of a joint and configured to apply a plurality of individual forces acting from the first side and using at least one retaining piece on a second side of the joint opposite the first side.

2. The method according to claim 1, wherein the drilling to obtain the hole of final dimension and the installation of the final fastener at each of the plurality of fastening positions are each performed in an automated manner.

3. The method according to claim 1, wherein the method includes removing the clamping device at least partially before performing the drilling to obtain the holes of final dimension and the installation of the final fasteners at the plurality of fastening positions.

4. The method according to claim 1, wherein during clamping the associated joining regions, the clamping device applies a clamping force at each of a plurality of clamping force application locations within the associated joining regions.

5. The method according to claim 4, wherein the clamping device applies individual clamping forces depending on the clamping force application location.

6. The method according to claim 1, wherein the components include at least one shell-type component.

7. The method according to claim 1, wherein the joint is a longitudinal joint.

8. The method according to claim 1, wherein the drilling to obtain the hole of final dimension and the installation of the final fastener at each of the plurality of fastening positions at the joint are performed at an automated station configured to additionally perform automated drilling of holes and automated installation of final fasteners at further fastening positions at a further joint.

9. The method according to claim 1, wherein to support reaction forces induced by the clamping, the clamping device is supported on the arrangement.

10. The method according to claim 9, further comprising using one of:
    a mechanical connection extending through the components in the associated joining regions,
    a magnetic force,
    a negative pressure, or
    a vacuum.

11. The method according to claim 1,
    wherein the plurality of fastening positions is or comprises a plurality of first fastening positions, and
    wherein the method comprises tacking the components at at least one second fastening position after the uncured layer of the sealant has been formed between the associated joining regions.

12. A method of assembling a structure in aircraft or spacecraft production, comprising:
    providing a plurality of components to be joined to each other at a joint to form a structural assembly, each of the components comprising a joining region;
    applying sealant to at least one of the components in the joining region thereof;
    forming an arrangement by positioning the components relative to each other, whereby an uncured layer of the sealant is formed between associated joining regions;
    clamping the associated joining regions against each other to achieve a clamped state using at least one clamping device and maintaining the clamped state of the associated joining regions at least until the layer of sealant therebetween and contacting the associated joining regions has cured to a pre-defined degree, the clamping device being installable on and transportable along with the arrangement; and
    after the layer of sealant has cured at least to the pre-defined degree, performing drilling at at least a plurality of fastening positions within the joining regions to obtain a hole of final dimension at each of the plurality of fastening positions, and performing installation of a final fastener at each of the fastening positions, wherein the plurality of fastening positions is or comprises a plurality of first fastening positions, wherein the method comprises tacking the components at at least one second fastening position after the uncured layer of the sealant has been formed between the associated joining regions, wherein tacking the components comprises tacking the components to each other in the joining regions using a tacking assembly comprising a coupling element extending through a preliminary hole at the second fastening position, wherein the preliminary hole has a non-final dimension, and wherein the method further comprises installing the clamping device on the arrangement by coupling the clamping device to the arrangement using at least the coupling element installed in the preliminary hole.

13. A method of assembling a structure in aircraft or spacecraft production, comprising:

providing a plurality of components to be joined to each other at a joint to form a structural assembly, each of the components comprising a joining region;

applying sealant to at least one of the components in the joining region thereof;

forming an arrangement by positioning the components relative to each other, whereby an uncured layer of the sealant is formed between associated joining regions;

clamping the associated joining regions against each other to achieve a clamped state using at least one clamping device and maintaining the clamped state of the associated joining regions at least until the layer of sealant therebetween and contacting the associated joining regions has cured to a pre-defined degree, the clamping device being installable on and transportable along with the arrangement; and after the layer of sealant has cured at least to the pre-defined degree, performing drilling at at least a plurality of fastening positions within the joining regions to obtain a hole of final dimension at each of the plurality of fastening positions, and performing installation of a final fastener at each of the fastening positions, wherein during clamping the associated joining regions, the clamping device applies a clamping force at each of a plurality of clamping force application locations within the associated joining regions, wherein the clamping forces are applied using a first clamping device part arranged on a first side of the joint and configured to apply a plurality of individual forces acting from the first side, and using a second clamping device part arranged on a second side of the joint opposite the first side and adapted to apply a plurality of individual forces acting from the second side; or wherein the clamping forces are applied using a first clamping device part arranged on a first side of the joint and configured to apply a plurality of individual forces acting from the first side, and using a second clamping device part configured as a common rigid counter support part and arranged on a second side of the joint opposite the first side; or wherein the clamping forces are applied using a clamping device part arranged on a first side of the joint and configured to apply a plurality of individual forces acting from the first side, and using at least one retaining piece on a second side of the joint opposite the first side.

14. The method according to claim 12, wherein the coupling element is formed as a rod.

15. The method according to claim 14, wherein the coupling element comprises a threaded rod, a bolt or screw.

16. The method according to claim 12, wherein de-installing at least one of the coupling elements, enlarging the preliminary hole used to accommodate the de-installed coupling element at the second fastening position, and installing a final fastener in the enlarged preliminary hole at the second fastening position are performed after automated drilling and automated installation of the final fasteners at the first fastening positions.

17. The method according to claim 12, wherein de-installing at least one of the coupling elements, enlarging the preliminary hole used to accommodate the de-installed coupling element at the second fastening position, and installing a final fastener in the enlarged preliminary hole at the second fastening position are performed before automated drilling and automated installation of the final fasteners at the first fastening positions.

18. The method according to claim 12, wherein at least one of the coupling elements is de-installed, and after de-installing the at least one of the coupling elements, drilling and installation of the final fasteners at the first fastening positions, enlarging the preliminary hole used to accommodate the de-installed coupling element at the second fastening position, and installing a final fastener in the enlarged preliminary hole at the second fastening position are performed in an automated manner.

19. The method according to claim 12,
wherein before the sealant is applied to the at least one of the components, the components are temporarily positioned relative to each other, and
wherein subsequently, pre-drilling is performed at the second fastening position to obtain the preliminary hole through the associated joining regions.

20. The method according to claim 12, wherein after the uncured layer of sealant has been formed between the associated joining regions, pre-drilling is performed at the second fastening position to obtain the preliminary hole through the associated joining regions.

* * * * *